US011808569B2

(12) United States Patent
Carothers

(10) Patent No.: US 11,808,569 B2
(45) Date of Patent: Nov. 7, 2023

(54) WAVEGUIDE ENHANCED ANALYTE DETECTION APPARATUS

(71) Applicant: STRIKE PHTONICS, INC, Dallas, TX (US)

(72) Inventor: Daniel Carothers, Lucas, TX (US)

(73) Assignee: Strike Photonics, Inc., Allen, TX (US)

( * ) Notice: Subject to any disclaimer, the term of this patent is extended or adjusted under 35 U.S.C. 154(b) by 417 days.

(21) Appl. No.: 17/204,276

(22) Filed: Mar. 17, 2021

(65) Prior Publication Data

US 2021/0293525 A1  Sep. 23, 2021

Related U.S. Application Data

(60) Provisional application No. 63/056,580, filed on Jul. 25, 2020, provisional application No. 62/993,033, filed on Mar. 22, 2020.

(51) Int. Cl.
| | | |
|---|---|---|
| *B01L 3/00* | (2006.01) | |
| *G01N 21/65* | (2006.01) | |
| *G02B 6/12* | (2006.01) | |
| *B82Y 15/00* | (2011.01) | |
| *G01B 9/02056* | (2022.01) | |

(52) U.S. Cl.
CPC .... *G01B 9/02058* (2013.01); *B01L 3/502715* (2013.01); *B01L 3/502761* (2013.01); *B82Y 15/00* (2013.01); *G01N 21/65* (2013.01); *G02B 6/12* (2013.01); *B01L 2300/168* (2013.01); *G02B 2006/12138* (2013.01); *G02B 2006/12159* (2013.01)

(58) Field of Classification Search
None
See application file for complete search history.

(56) References Cited

U.S. PATENT DOCUMENTS

| | | |
|---|---|---|
| 4,908,112 A | 3/1990 | Pace |
| 6,603,548 B2 | 8/2003 | Church et al. |
| 7,391,936 B2 | 6/2008 | Pau et al. |

(Continued)

FOREIGN PATENT DOCUMENTS

| | | |
|---|---|---|
| CN | 10873693 A | 3/2020 |
| CN | 111965141 A | 11/2020 |
| WO | WO2020097268 A1 | 5/2020 |

OTHER PUBLICATIONS

Chang, Y. et. al "Cocaine Detection By A Mid-Infrared Waveguide Integrated With A Microfluidic Chip," 3020-3023. Lab On Chip, 2012, 12.

(Continued)

*Primary Examiner* — Neil N Turk
(74) *Attorney, Agent, or Firm* — Charles W Gaines

(57) ABSTRACT

This disclosure provides photonic integrated chip that has an optical waveguide located on a photonic circuit substrate that includes a photonic circuit that is optically coupled to the waveguide. A microfluidic channel is in a silicon substrate and is attached to the photonic circuit substrate. The microfluidic channel is positioned over the optical waveguide such that its side surfaces and an outermost surface extend into the microfluidic channel. The microfluidic channel extends along a length of the optical waveguide, and nanoparticles are located on or adjacent the optical waveguide located within the microfluidic channel.

10 Claims, 27 Drawing Sheets

(56) References Cited

U.S. PATENT DOCUMENTS

| | | | |
|---|---|---|---|
| 7,433,552 | B2 | 10/2008 | Kiesel et al. |
| 7,483,140 | B1* | 1/2009 | Cho ................... G01N 21/553 |
| | | | 356/448 |
| 7,630,063 | B2 | 12/2009 | Padmanabhan et al. |
| 8,018,595 | B2 | 9/2011 | Huh et al. |
| 8,216,518 | B2 | 7/2012 | Chau et al. |
| 8,241,487 | B2 | 8/2012 | McCann et al. |
| 8,472,758 | B2 | 6/2013 | Bulovic et al. |
| 9,322,995 | B2 | 4/2016 | Erickson et al. |
| 9,612,197 | B2 | 4/2017 | Chau et al. |
| 9,664,500 | B2 | 5/2017 | Wang et al. |
| 9,766,223 | B2 | 9/2017 | Gourley |
| 10,054,546 | B2 | 11/2018 | Stievater et al. |
| 10,481,348 | B2 | 11/2019 | Song et al. |
| 10,830,936 | B2 | 11/2020 | Menezes et al. |
| 2002/0189945 | A1* | 12/2002 | Ruggiero ............. G01N 21/171 |
| | | | 204/601 |
| 2003/0096081 | A1* | 5/2003 | Lavallee ................. B01F 33/30 |
| | | | 428/156 |
| 2004/0086427 | A1* | 5/2004 | Childers ........... B01L 3/502715 |
| | | | 436/180 |
| 2008/0019876 | A1 | 1/2008 | Chau et al. |
| 2008/0267564 | A1 | 10/2008 | Han et al. |
| 2009/0190877 | A1* | 7/2009 | Wang ................. G01N 21/7703 |
| | | | 385/12 |
| 2010/0128275 | A1* | 5/2010 | Chau ................. G01N 21/7703 |
| | | | 977/954 |
| 2012/0021525 | A1* | 1/2012 | Fehr ....................... G01N 21/75 |
| | | | 250/226 |
| 2013/0170782 | A1 | 7/2013 | Evans et al. |
| 2016/0334866 | A9 | 11/2016 | Mazed et al. |
| 2017/0268988 | A1 | 9/2017 | Swanson |
| 2018/0126381 | A1 | 5/2018 | Huff et al. |
| 2018/0214863 | A1 | 8/2018 | Sui et al. |
| 2019/0025505 | A1 | 1/2019 | Kraft |
| 2019/0170631 | A1 | 6/2019 | Shachar et al. |
| 2019/0310247 | A1 | 10/2019 | Tak et al. |
| 2019/0336006 | A1 | 11/2019 | Horstmeyer et al. |
| 2019/0360913 | A1 | 11/2019 | Schmidt |
| 2020/0072828 | A1 | 3/2020 | Chau et al. |
| 2020/0166453 | A1 | 5/2020 | Lendl et al. |
| 2023/0133866 | A1* | 5/2023 | Vermeulen ........... G02B 6/2938 |
| | | | 435/6.19 |
| 2023/0152233 | A1* | 5/2023 | Zhao .................... G01N 33/487 |
| | | | 356/301 |

OTHER PUBLICATIONS

Dhakal, Ashim, et. al "Evanescent excitation and collection of spontaneous Raman spectra using silicon nitride nanophotonic waveguides," Photonics Resarch Group, Intec Department, Ghent University, Apr. 28, 2014, Belgium.

Chad G. Atkins, et al., Raman Spectroscopy of Blood and Blood Components, Applied Spectroscopy, 2017, vol. 71(5) 767-793.

Ilokugbe Ettah, et al., Engaging with Raman Spectroscopy to Investigate Antibody Aggregation, Department of Chemnistry, Lancaster University, Lancaster, Lancashire LA1 4YB, UK.

Andrew J. Berger, et al. Multicomponent blood analysis by near-infrared Raman Spectroscopy, Applied Optics, vol. 38, No. 13, May 1999.

Annika M.K. Enejder, et al., Blood analysis by Raman Spectroscopy, Optics Letters, vol. 27, No. 2, Nov. 15, 2002.

Haiyi Bian, et al., Dual-model analysis for improving the discrimination performance of human and nonhuman blood based on Raman spectroscopy, Biomedical Optics Express 3512, vol. 9, No. 8, Aug. 2018.

Ben Hansson, et al. Development of a flow cell based Raman spectroscopy technique to overcome photodegradation in human blood, Biomedical Optics Express 2275, vol. 10, No. 5, May 2019.

Audrey E. Baker, et al., Raman spectroscopy characterization of antibody phases in serum, nAbs 6:6, 1509-1517, Nov./Dec. 2014.

Nan Li, et al., A Noninvasive Accurate Measurement of Blood Glucose Levels with Raman Spectroscopy of Blood in Microvessels, MOE Key Laboratory of Laser Life Science & Laboratory of Photonic Chinese Medicine, College of Biphotonics, South China Normal University, Guangdon 510631, Chima, Apr. 13, 2019.

Kate L. Bechtel, et al., Intrinsic Raman spectroscopy for quantitative biological spectroscopy Part II, NIH Public Access, 16(17), 12737-12745, Aug. 18, 2008.

Wei-Chuan, et al., Intrinsic Raman spectroscopy for quantitative biological spectroscopy Part I: Theory and simulations, NIH, Public Access, 16(17), 12726-12736, Aug. 18, 2008.

Alexandra V. Soldatova, et al., New Light on NO Bonding in Fe(III) Heme Proteins from Resonance Raman Spectroscopy and DFT Modeling, NIH Public Access, 132(13), 4614-4625, Apr. 7, 2010.

Ishan Barman, et al., Turbidity corrected Raman spectroscopy for blood analyte detection, NIH Public Access, 81(11), 4233-4240, Jun. 1, 2009.

Ishan Barman, et al., An accurate spectroscopic calibration for non-invasive glucose monitoring by modeling the physiological glucose dynamics, NIH Public Access, 82(14), 6104 6114, Jul. 15, 2010.

Ishan Barman, et al., Raman spectroscopy based sensitive and specific detection of glycated hemoglobin, NIH Public Access, 84(5), 2472-2482, Mar. 6, 2012.

Narahara Chari Dingari, et al., Investigation of the specificity of Raman sepectroscopy in non-invasive blood glucose measurements, NIH Public Access, 400(9), 2871-2880, Jul. 2011.

Anna K. Boardman, et al., Rapid Detection of Bacteria from Blood with Surface-Enhanced Raman Spectroscopy, HHS Public Access, Anal Chem., 88(16), 2026-8035, Aug. 16, 2016.

Rekha Gautam, et al., Non-Invasive Analysis of Stored Red Blood Cells Using Diffuse Resonance Raman Spectroscopy, HHS Public Access, Analyst, 143(24), 5950-5958, Dec. 13, 2018.

Jingwei Shao, et al., In Vivo Blood Glucose Quantification Using Raman Spectroscopy, PLoS One 7(10): e48127.

Gunes Acikgoz, et al. Determination of Ethanol Blood Samples Using Partial Least Square Regression Applied to Surface Enhanced Raman Spectroscopy, Toxicological Research, vol. 34, No. 2, pp. 127-132, 2018.

Alina Zettner, Ardian B. Gojani, Thomas Schmid and Igor B. Gornushkin, "Evaluation of a Spatial Heterodyne Spectrometer for Raman Spectroscopy of Minerals," MDPI, Feb. 24, 2020, Basel, Switzerland.

* cited by examiner

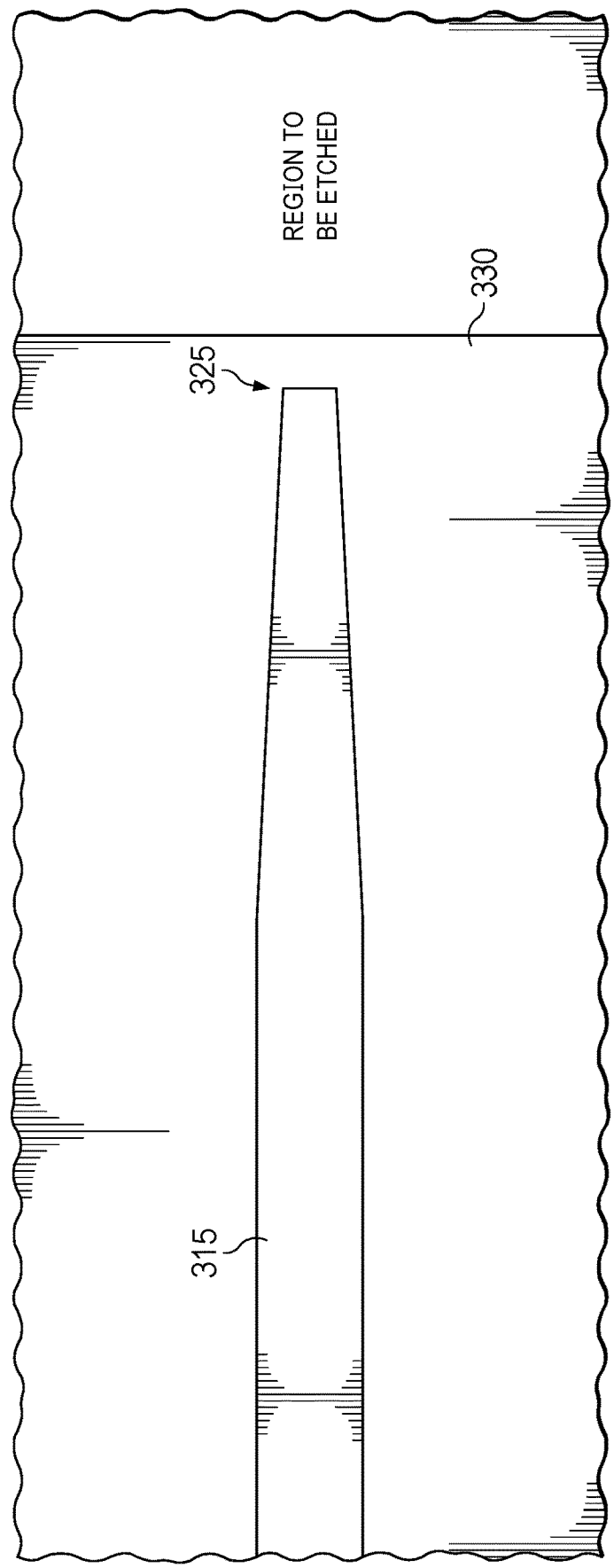

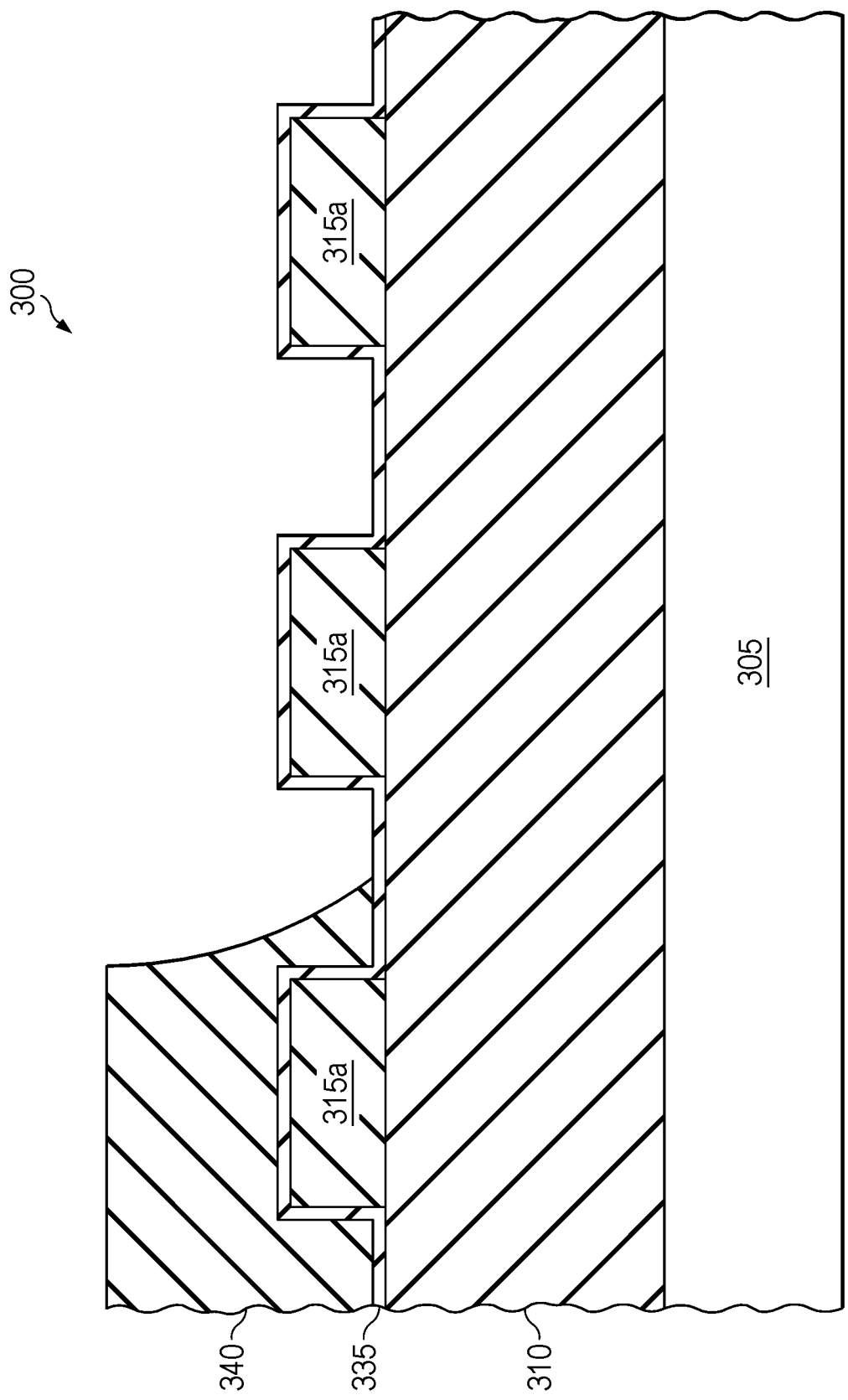

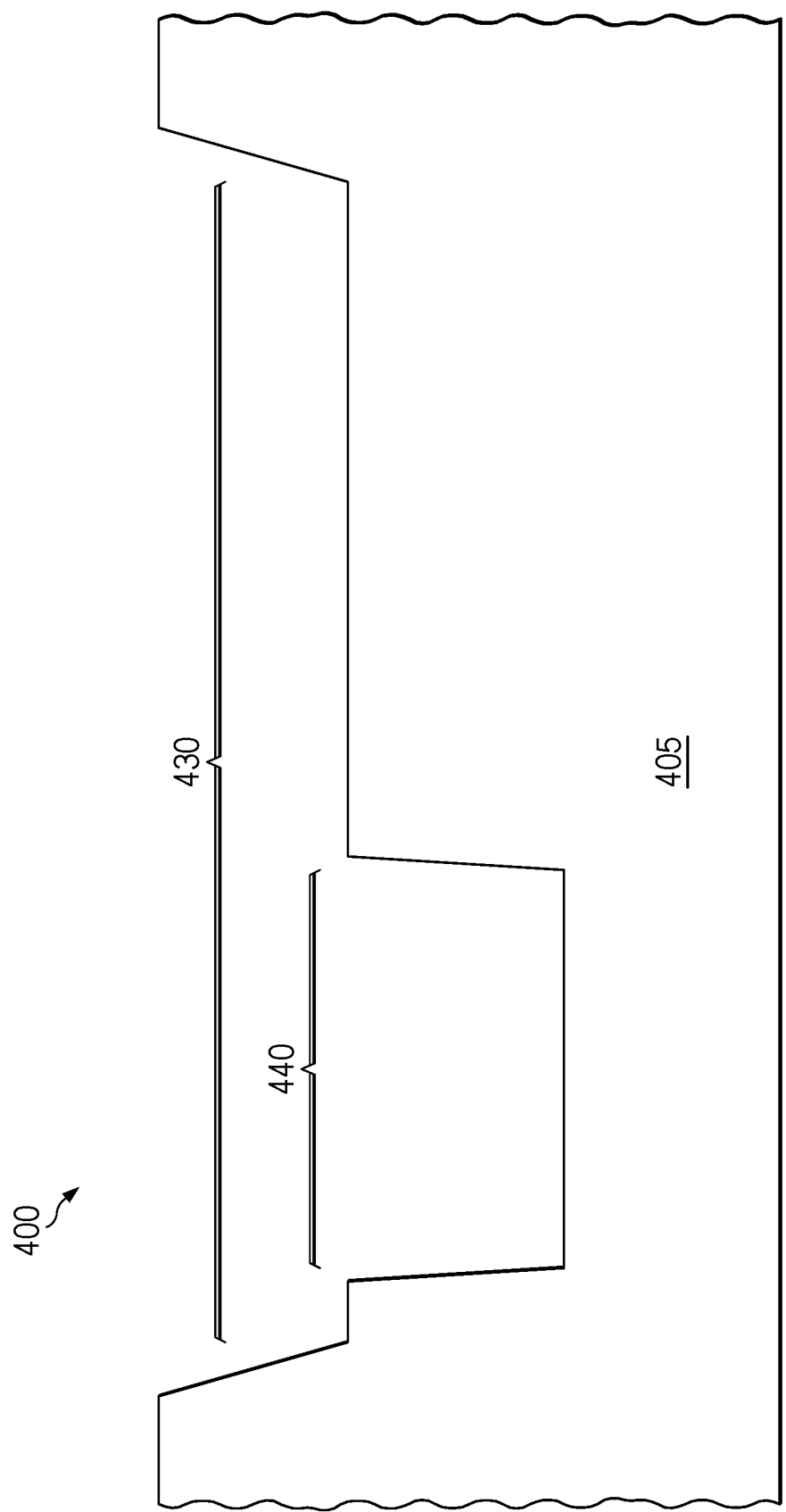

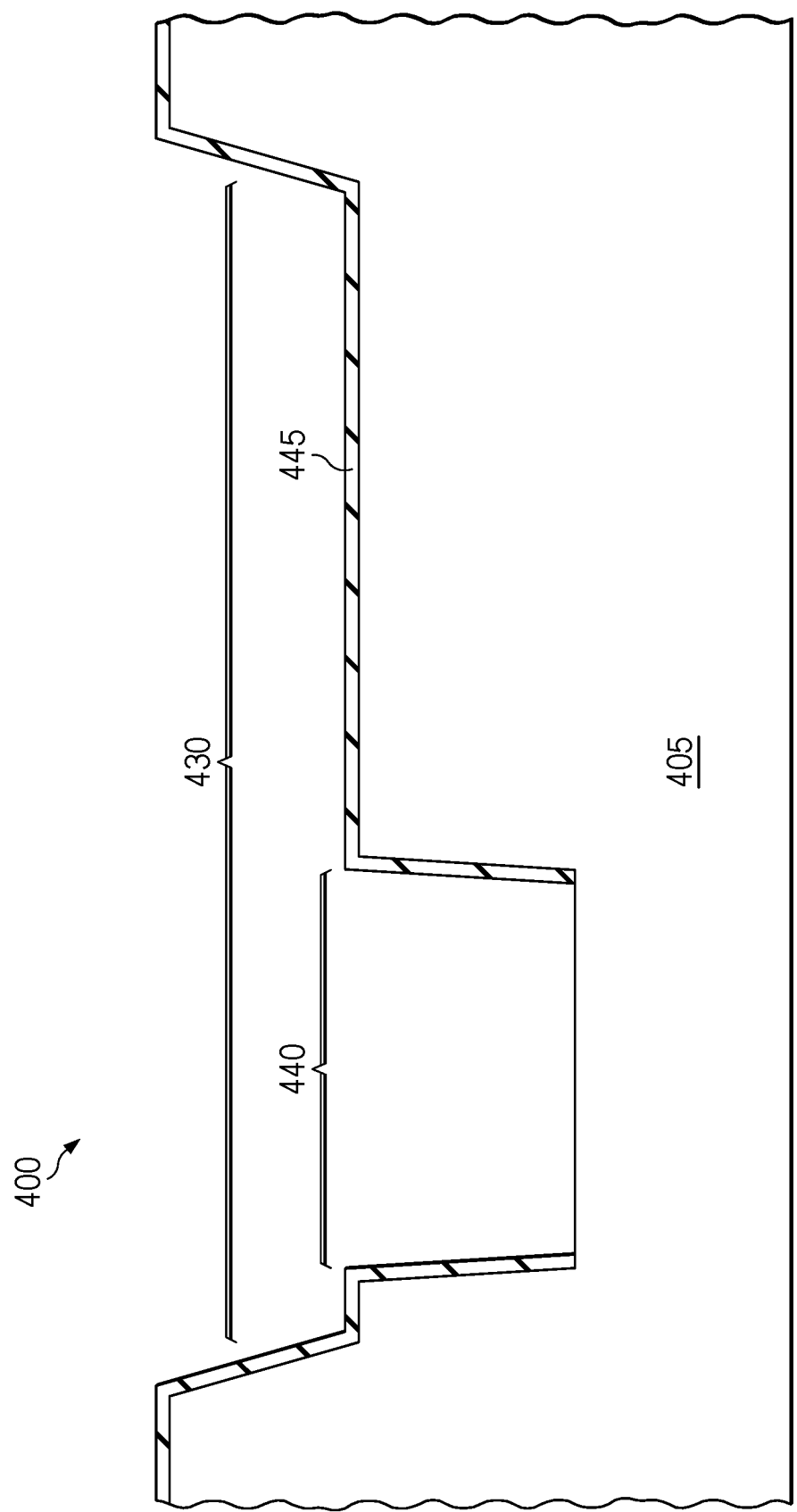

WAVEGUIDE ENHANCED ANALYTE DETECTION APPARATUS

CROSS-REFERENCE TO RELATED APPLICATION

This application claims the benefit of U.S. Provisional Application Ser. No. 62/993,033 filed on Mar. 22, 2020, entitled: "WAVEGUIDE ENHANCE ANALYTE DETECTION;" and U.S. Provisional Application Ser. No. 63/056,580, filed on Jul. 25, 2020, entitled: "ENHANCED WAVEGUIDE WITH MICROFLUIDIC PUMP;" commonly assigned with the present invention and incorporated herein by reference.

TECHNICAL FIELD OF THE INVENTION

The present invention is directed to a photo optical device for the rapid detection or presence of an analyte, including analyte pathogens, such as viruses or bacteria, or drugs, or cancer cells.

BACKGROUND OF THE INVENTION

With the sudden onset of novel viruses, such as COVID-19, there has arisen an urgent need for rapid detection of possibly infected individuals. Pandemics, such as the very recent COVID-19 virus, has highlighted numerous problems associated with the testing technological response to new and evolving biological threats. Current testing technologies not only face current supply shortages, but they also do not provide a means for quickly obtaining and reporting results. For example, current testing technologies require several days in which to ascertain the presence of a virus. Moreover, if the subject has not been infected for enough time, the test may indicate a false negative, thereby unknowingly causing exposure to the general populous. Current testing technology also lacks the ability to rapidly identify and track mutations. Further, the delayed reporting time causes governmental authorities to lack current data that can be critical in forming and implementing the appropriate policies.

Accordingly, what is urgently needed in the art is a rapid response testing technology that can accurately and quickly determine and report the presence of pathogen in a potentially infected subject.

SUMMARY OF THE DISCLOSURE

To address the above-discussed deficiencies of the prior art, the present disclosure provides a unique, optically based detection technology that provides for accurate measurements and detection that are direct, rapid, and have increased sensitivity in detection of analytes, including human pathogens, such as viruses or bacteria, as well as drugs or cancer cells. As the covid-19 virus continues to spread, this technology is critical to close the gap between the unacceptably low sensitivity levels and faulty results of current bioassays and the burgeoning need for more rapid and sensitive detection of a wider range of infectious agents with a single platform.

The embodiments as presented herein provide a photonic processing solution with microfluidics and additive manufacturing to implement a compact and surface-enhanced Raman Spectroscopy (SERS) based system to provide rapid viral detection, identification, and reporting solution. These embodiments provide highly accurate, near-real-time, screening and reporting for the presence of any specific pathogen with a device acquisition cost that will permit deployment to any medical facility, public health, and first-responder unit. The Raman spectrum from the SERS interactions is detected using a detector coupled with a Michelson interferometer. The embodiments disclosed herein provide the following: real time remote detection and monitoring of infection; rapid simultaneous identification of the infecting agent, controlled and isolated test protocols limiting the transport or exposure of personnel to contaminated fluids; wireless transmission of data from the test strip to personnel isolated from the test subject; near instantaneous test results; implementation of a test that does not require reagents which can age out or secondary processing of samples; test components which are low cost, easy to manufacture, rapidly deployable and operated with minimal training; and expanded application beyond viral detection.

The foregoing has outlined features so that those skilled in the art may better understand the detailed description that follows. Additional features will be described hereinafter that can form the subject of the claims. Those skilled in the art should appreciate that they can readily use the disclosed conception and specific examples as a basis for designing or modifying other structures for carrying out the same purposes disclosed herein. Those skilled in the art should also realize that such equivalent constructions do not depart from the spirit and scope of the disclosure.

BRIEF DESCRIPTION OF THE DRAWINGS

For a more complete understanding of the present invention, reference is now made to the following descriptions taken in conjunction with the accompanying drawings, in which:

FIGS. 3A-3I illustrate various intermediate steps of one embodiment of a process that can be used to fabricate the photonic integrated circuit of the test chip;

FIGS. 4A-4H illustrate various intermediate steps of one embodiment of a process that can be used to fabricate the microfluidic channel of the test chip;

DETAILED DESCRIPTION

There is a critical need for systems that provide real time detection and characterization of human viruses, as well as other biochemical and non-biochemical analysis. Currently, pathogens, such as the Coronavirus, covid-19, has spread without successful containment due to the combination of long cycle incubation, early non-symptomatic transmission, airborne transmission, and its highly infectious nature. The lack of a simple, rapid, and efficient point of test detection capability, has allowed infected persons to transition from quarantine early or miss quarantine entirely until they became symptomatic. Additionally, other biochemical and non-biochemical analysis often requires quick results as well. The various embodiments presented in this disclosure addresses these current and urgent needs.

Figure 1A:
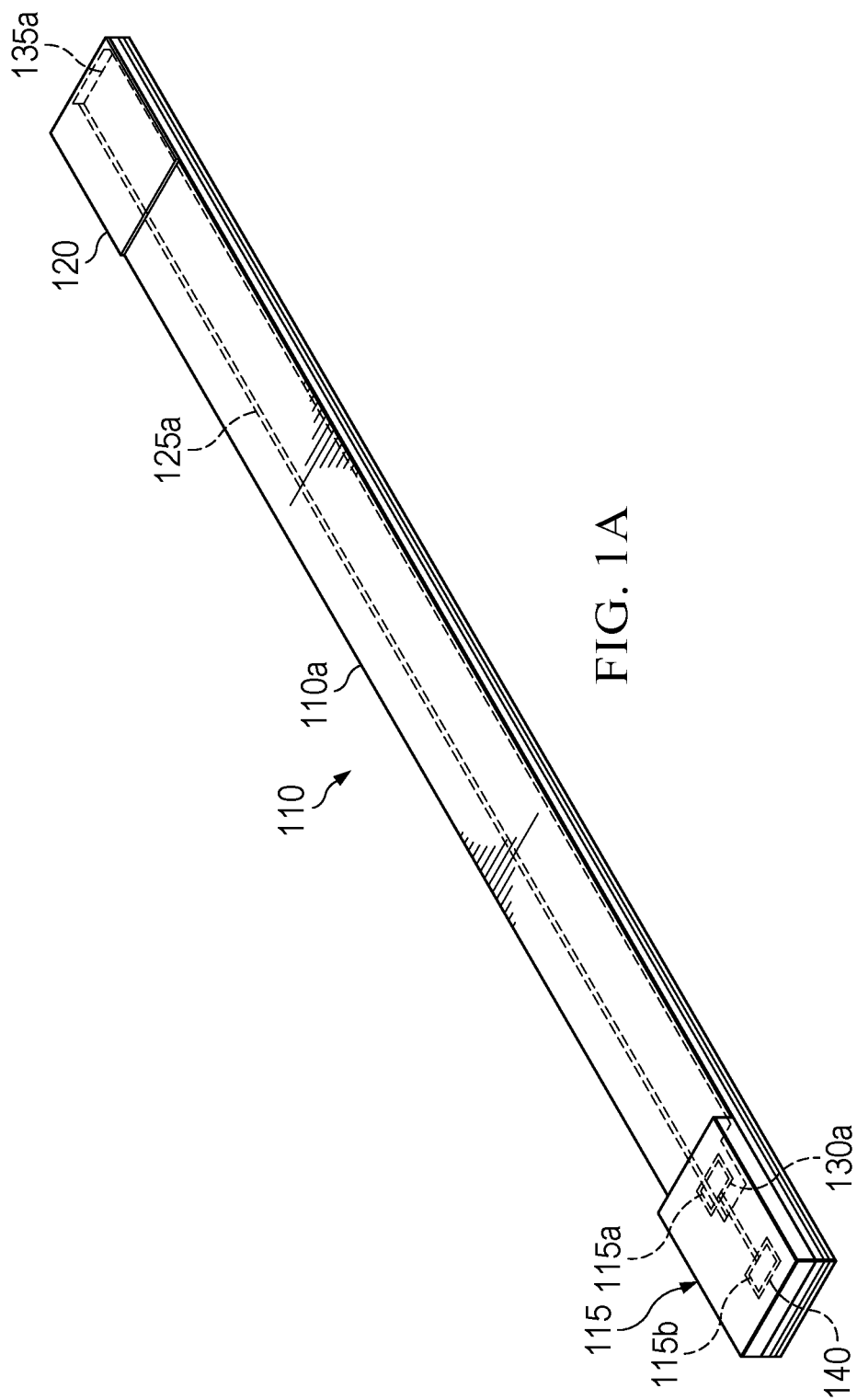
FIGS. 1A-1B illustrate perspective views of one embodiment of the test strip as provided by this disclosure.

FIG. 1A is a perspective view of an embodiment of a test strip 110, which has compact dimensions. For example, in one embodiment, the test strip is 0.5 mm thick, 4.0 mm wide and 50.0 mm long. However, the test strip 110 is not limited to just these dimensions, and in other embodiments, the test strip 110 may have different dimensions, as different designs may require. Even given its compact size, the length of the test strip 110 has a collection strip section 110a that provides a relatively large sampling channeling area along its length that allows for more interferometer data, such as Raman Spectroscopy data, to be collected, leading to more accurate results. The test strip 110 includes an integrated photonic chip 115, as discussed in more detail below, located on one end with a strip label 120 located on an opposing end of the test strip. In one embodiment, the test strip 110 includes a first input port 135a located on the end of the strip label 120. The first input port 135a is fluidly connected to a fluid passageway 125a that extends to a second input port 130a, into which fluid flows from the fluid passageway 125a into the integrated photonic 115 through a third input port 115a and exits the integrated photonic chip 115 through an exit port 115b and vent port 140 that are fluidly connected. The first input port 135a, the fluid passageway 125a, the second fluid input port 130a and vent port 140, form a portion of the collection strip 110a.

Figure 1B:
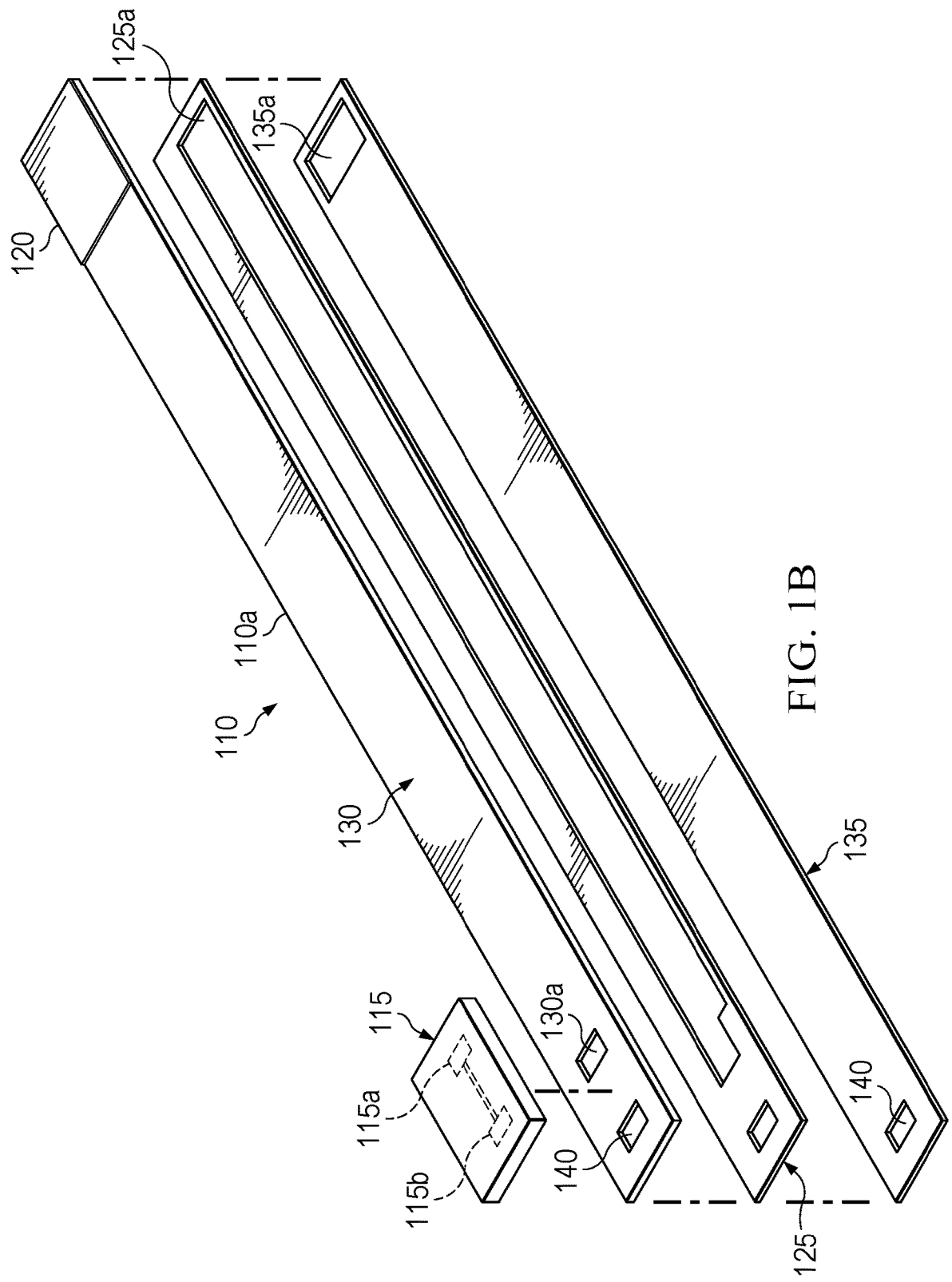

FIG. 1B is an exploded view of an embodiment of FIG. 1A that shows a spacer 125, such as a printed circuit board, having traces thereon for data transmission, located between top and bottom films 130, 135, respectively, with the first and second input ports 135a and 130a, respectively formed on opposing ends of the test strip 110, as generally illustrated in FIG. 1B. The spacer 125 has a cut-out region that forms the fluid passageway 125a through the length of the test strip 110 that extends to the integrated photonic chip 115. In addition, the end of the test strip 110 adjacent the end on which the integrated photonic chip 115 is located, includes vent ports 140 formed in both the top and bottom films 130, 135, as generally shown. As discussed above, the fluid travels through fluid passageway 125a and the second input port 130a and into the integrated photonic chip 115 through the third input port 115a. The fluid exits the integrated photonic chip 115 through exit port 115b and vent ports 140 that allow the test fluid to exit the integrated photonic chip 115. In one aspect, the test strip 110 may be packaged on mylar or other polymer films and leverage additive manufacturing and laser cutting can be used to reduce costs and increase flexibility. In such instances, 2 rolls of mylar are hot pressed around inkjet printed spacer material. USB electrical interconnect lines are printed on the surface, as are the labels. Battery or electrical leads are also provided to provide electrical coupling to a power source to the test strip 110, as discussed below.

Figure 2:
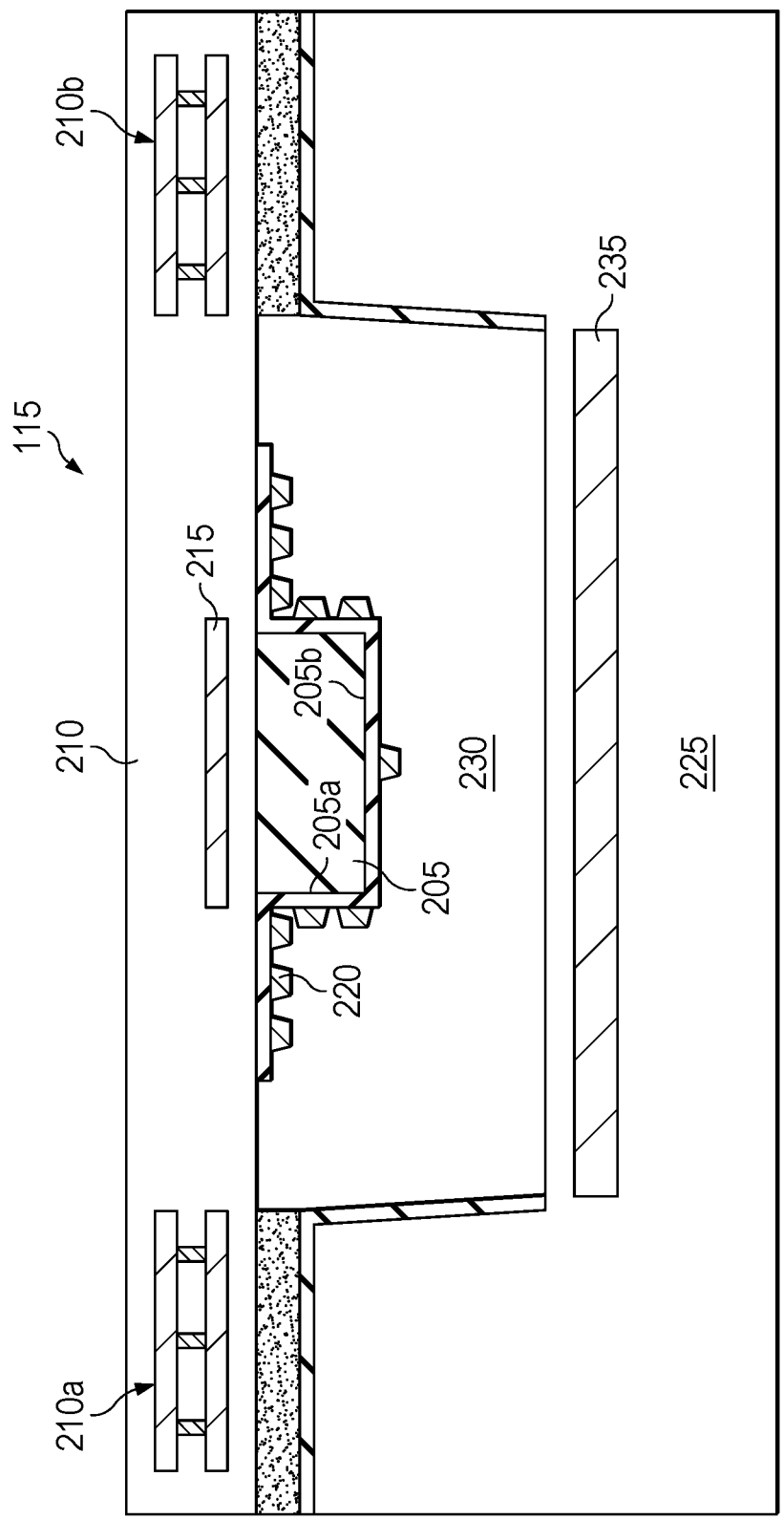
FIG. 2 illustrates a partial section view of the test chip located on the test strip.

FIG. 2 illustrates a partial cross-section view of an embodiment of the integrated photonic chip 115, as generally shown in FIGS. 1A and 1B. In the illustrated embodiment, the integrated photonic chip 115 includes a waveguide 205 located on a photonic integrated circuit (PIC) substrate 210. The PIC substrate 210 may be comprised of known materials, such as silicon dioxide on a silicon substrate and includes one or more interconnected metal levels 210a, 210b, formed within the silicon dioxide layer. These features may be fabricated, using known lithographic and deposition processes. In one embodiment, one of the metal levels 210a, 210b of the PIC 210 may include a backing electrode 215 that can be used to provide a dielectrophoretic field along at least a portion of the length of the waveguide 205. However, in other embodiments, the backing electrode 215 is optional, and thus, may not be present in certain embodiments. In one embodiment, the waveguide 205 may be comprised of a silicon nitride material, which can be deposited and etched using known lithographic and deposition processes. Silicon nitride is given as an example, but other types of waveguides may be used, such as Gallium Arsenide, Aluminum Gallium Arsenide, Silicon, Aluminum Oxides, Silicon Oxy-Nitrides, Doped Silicon dioxide (Titanium, Lithium, phosphorus, boron, etc.), or combinations thereof. The PIC substrate 210, metal levels 210a, 210b, and waveguide 205, along with the other components discussed below form a unique photonic integrated circuit.

Nanoparticles 220, such as silver, gold, copper, or combinations thereof, are located on or ("or" as used herein and in the claims includes conjunctive and disjunctive forms, "and/or") adjacent the waveguide 205. In one embodiment, the concentration of the nanoparticles 220 may be greater on or adjacent side surfaces 205a of the waveguide 205 than on an outer surface 205b of the waveguide 205. The nanoparticles 220 extend along a sensor portion of the length of the waveguide 205. The sensor portion may extend the full length of the waveguide 205 or only a portion of it. In one embodiment, the waveguide 205 has cladded and uncladded portions, wherein the uncladded portions function as the sensor portion(s). In such embodiments, the nanoparticles 220 are located on the uncladded portions, whereas in other embodiments, the full length of the waveguide 205 may be cladded and the nanoparticles may be deposited on the cladding of the waveguide 205.

The nanoparticles 220 provide improved data collection as it relates to the test fluid or analyte in that the nanoparticles help shape the charge transfer or plasmonic resonance. Though metals are mentioned specifically, other highly conductive materials that can be deposited or formed at the nano scale may also be used. Semiconducting materials that have been considered for use include narrow bandgap materials such as silicon carbide, carbon, or gallium nitride as well as narrower bandgap materials such as germanium, lead selenide, lead telluride, Gallium Antimonide, Gallium Arsenide, Indium Phosphide. There are additionally, several evolving semiconductors whose nanostructure behaviors may have unique benefits, such as the chalcoginide molybdenum disulfide ($MoS_2$).

A second silicon substrate 225 is bonded to the PIC substrate 210 on the side on which the waveguide 205 is located. The second silicon substrate 225 has a microfluidic channel 230 formed therein, and in one embodiment, includes an optional driving electrode 235 that works in conjunction with the backing electrode to provide a dielectrophoretic field along at least a portion of the length of the waveguide 205. Known fabrication lithographic processes may be used to form the driving electrode 235. The microfluidic channel 230 encapsulates the waveguide 205, such that the side surfaces 205a and outermost surface 205b of the waveguide 205 extend into the microfluidic channel 225, as generally shown. The microfluidic channel 230 provides a channel into which a test fluid or analyte may be placed.

In those embodiments where the backing electrode 215 and the driving electrode 235 are present, they can be used to produce an additional field to promote controlled transition of the target molecule, such as a pathogen, to the nanostructure surface. As seen in the illustrated embodiment, the driving electrode 235 is located within the silicon substrate 225 and adjacent the microfluidic channel 230 and the backing electrode is located adjacent the waveguide 205 and within the PIC substrate 210, as generally shown. These electrodes can be used to apply high-frequency (3-5 MHz) voltage to the electrodes for generating a dielectrophoretic (DEP) force within the microfluidic channel to drive the target analytes to the nanoparticle measuring surface.

The DEP may be used to drive biomolecules of a specific mass and size to the measurement surface dramatically enhancing the quantity of the target analyte which will interact with the evanescently guided probe beam. DEP forces can be applied to both conducting and non-conducting particles and can be generated either by using direct current (DC) or alternating current (AC) fields. Dielectrophoretic forces achieves a highly accurate classification of viruses. The DEP force is a force exerted on a suspended particle in the presence of a non-uniform electric field. The magnitude and direction of the force are related to the electric field intensity, particle radius, permittivity of the particle and suspending fluid, as well as the conductivity the particle and suspending fluid. DEP offers the controllable, selective, and accurate manipulation of target viruses.

As known, DEP is the movement of a particle in a non-uniform electric field due to the interaction of the biomolecule's dipole and spatial gradient of the electric field. The biomolecule dipole primarily originates from two phenomena. 1) The permanent dipole due to the orientation and configuration of the atoms, and 2) The induced dipole resulting from the application of an external electric field which introduces a re-distribution of charge on the particle's surface.

The behavior of the biomolecule can be described by its polarizability, the measure of the ability of a material to produce charge at the interface. Its polarizability is the measure of the ability of the material to respond to an electric field, which has three basic mechanisms, namely (i) electronic polarization, (ii) atomic polarization and (iii) orientation polarization.

Interfacial polarizability is limited since it is the origin of the induced dipole on particles within the operating frequencies of 10 kHz to 100 MHz. If the polarizability of the particle is higher than that of the medium, more charges will accumulate at the particle's side. If the polarizability of the medium is higher than that of the particle, more charges will accumulate at the medium's side. This non-uniform distribution of the charges means a difference in the charge density on either side of the particle which leads to an induced dipole across the particle aligned with the applied electric field. When the particle-medium system is placed in a non-uniform electric field, the particle feels different forces at each end. The difference in force at both ends generates a net force in either direction depending on the polarizability of the particle and the medium.

Common practice for application of alternating current dielectrophoresis AC-DEP is an array of metal electrodes embedded inside the microchannel network. Most of the time, these internal electrodes are planar (2-D) ones (i.e., height of the electrodes are in the order of hundred nanometers) are fabricated within the device. AC-DEP is advantageous due to the low operating voltage that prevents Joule heating. Moreover, the lower applied voltages simplify the circuitry required to generate the electric fields, making AC-DEP focused systems compatible with integrated circuits and suitable for battery powered hand-held devices.

Thus, DEP enhances viral detection technology, enhancing or enriching the quantity of selective viral analytes deposited on the measurement surface. Alternative, other embodiments may employ variable frequency and phase selective dielectrophoresis to separate biomolecules by size and structure to allow selective, simultaneous, characterization and identification of a multiplicity of analytes within the same test structure.

Figure 3A:
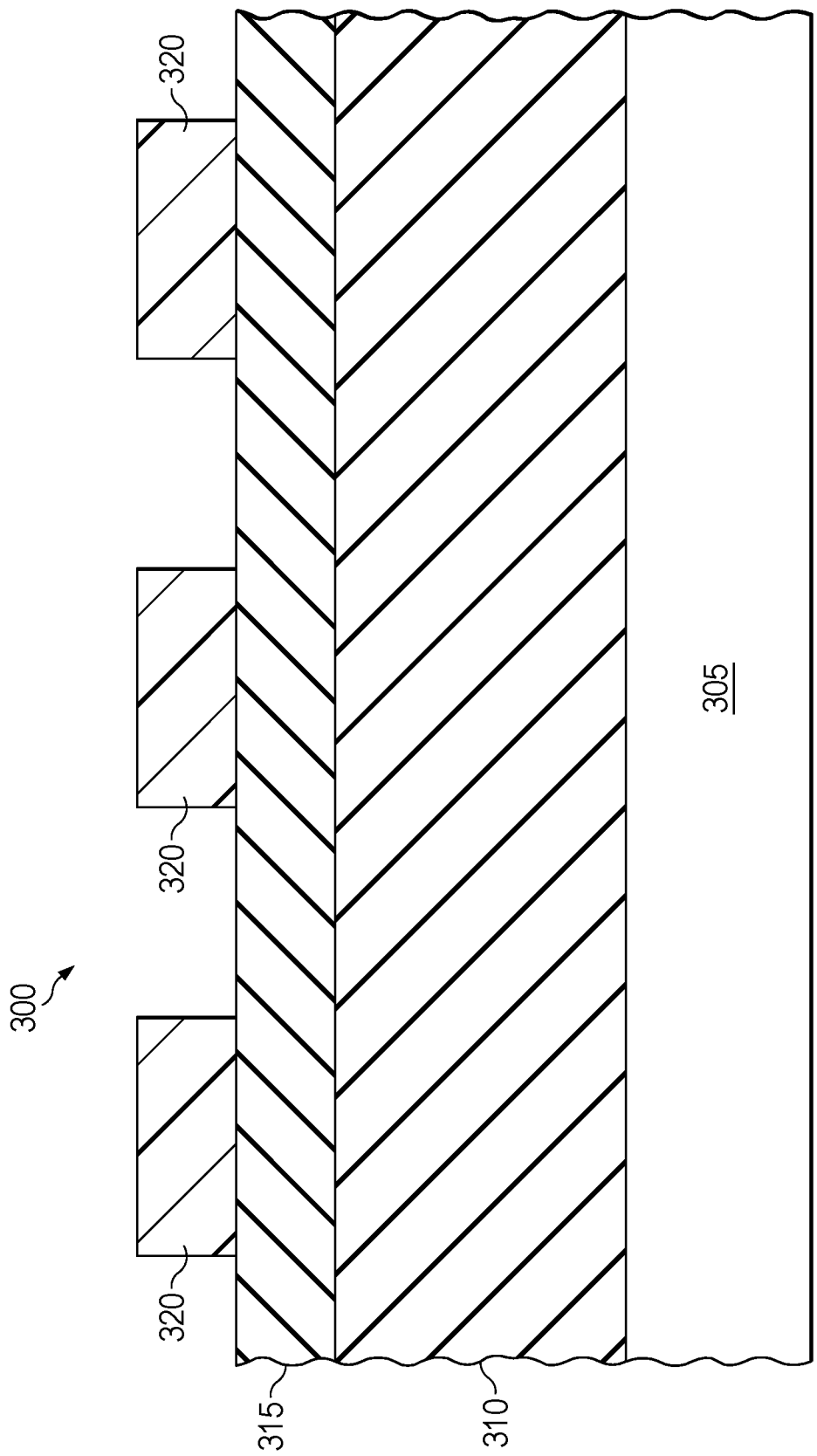

FIGS. 3A-3I illustrate partial cross-sections of intermediate structures 300 of one embodiment of a process that can be used to fabricate a plurality of the waveguide 205 of the integrated photonic chip 115. FIG. 3A illustrates a silicon substrate 305 on which a silicon dioxide layer 310 has been grown. Also seen are a silicon nitride layer 315 and a patterned photoresist layer 320 located on the silicon nitride layer 315. Known processes and materials may be used to form the illustrated intermediate structure, as hereafter discussed. In one embodiment, the silicon substrate 305 may be a 200 mm silicon wafer doped with a P-type dopant. Depending on the embodiment, the dopant concentration and thickness may vary. In one embodiment, the silicon dioxide layer 310 may be formed to a thickness of 2000 nm. The thickness of the silicon nitride 315 layer that will be later patterned to form the waveguides may also vary. In certain embodiments, the thickness may range from about 100 nm to about 200 nm. In one embodiment, a dry etch may be used to etch the unmasked portions of the silicon nitride layer 315 to produce waveguides having a spacing, that may vary, depending on design requirements. For example, in one embodiment, the spacing between the etched waveguides may be about 300 nm.

Figure 3B:
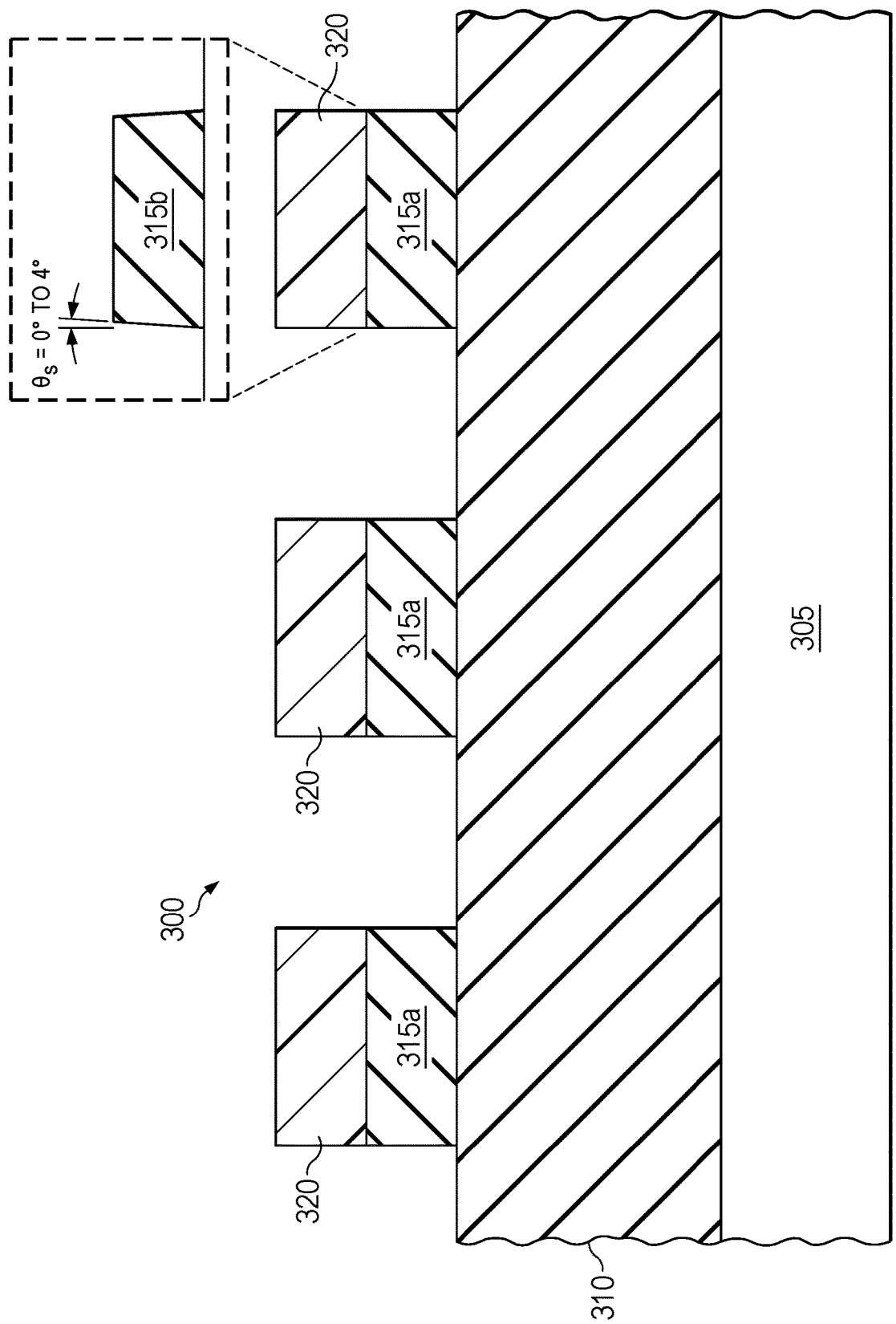
Figure 3C:
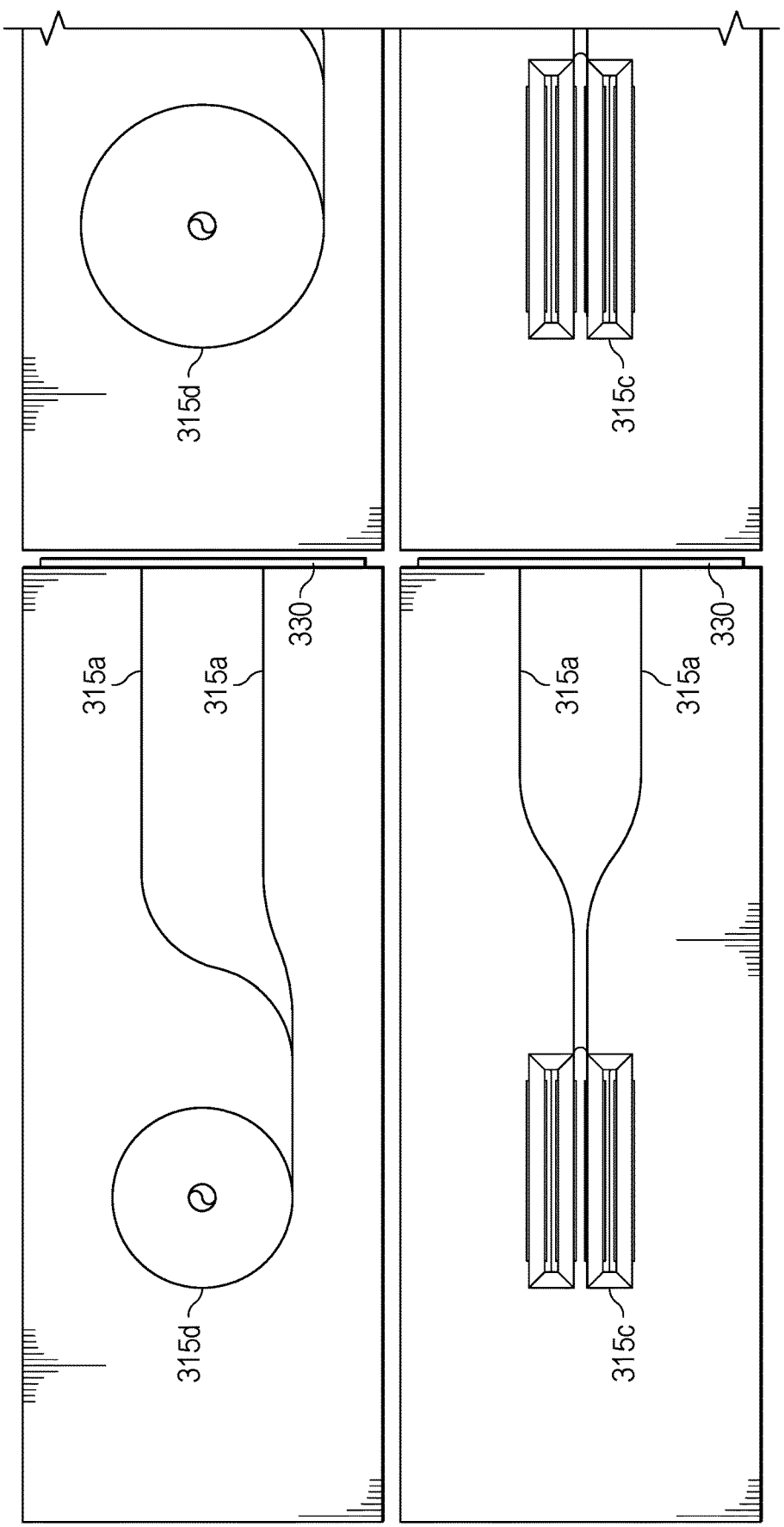

FIG. 3B illustrates the intermediate embodiment of the device shown in FIG. 3A, following the patterning of the silicon nitride 315 to form a plurality of waveguides 315a. In one embodiment a known dry etch may be used to form the waveguides 315a. As shown in an enlarged view 315b of one of the waveguides 315a, the dry etch may cause the edges of the waveguides to taper from about 0° to about 4°. The tapered edges of the waveguides 315a help to further shape the charge transfer or plasmonic resonance. Following the dry etch, the remaining photoresist 320 is removed from the waveguides 315a using known processes, such as strip resist and wafer clean processes. In some embodiments, the waveguides 315a may be patterned into various serpentine geometric designs to increase the interrogation or data collection lengths of the waveguide. For example, FIG. 3C illustrates a couple of examples in which the waveguides 315a may be patterned in a rectangular folded configuration 315c, or a circular configuration 315d. These are only a couple of examples, and other geometric designs are also within the scope of this disclosure. Additionally, during the patterning of the photoresist, the same reticle can be used to form a tapered region 325, as seen in FIG. 3D, near an etched facet surface 330. This narrowed tapered region 325 provides for improved modal and optical transmission near the output end of the waveguides. In one embodiment, a deep etch may be conducted to define the optical facet surface 330 at the end of the silicon nitride waveguide 315, as seen in FIG. 3D. This optional etch would be conducted to etch through the underlying silicon oxide and then 2-3 microns into the silicon. In such embodiments, a subsequent wet clean may be required to obtain a smooth oxide surface.

Figure 3E:
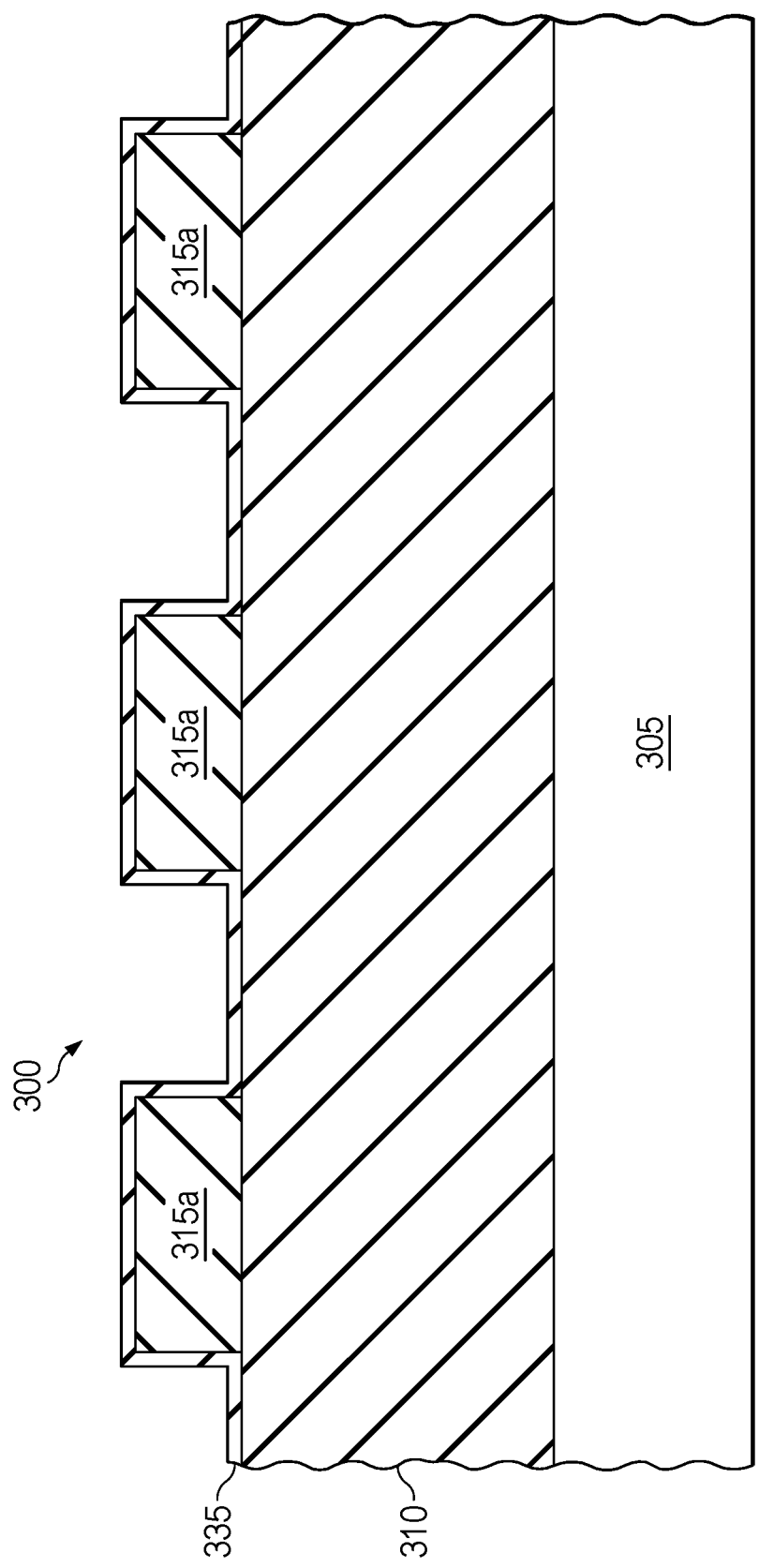

FIG. 3E illustrates the device of FIG. 3B following the removal of the remaining photoresist 320 and the deposition of a nitride etch stop 335 that provides etch control for a subsequent wet etch process. Known deposition processes may be used to deposit the nitride etch stop 335 and may be deposited to a thickness ranging from about 20 nm to about 30 nm. The nitride etch stop 335 provides etch control for a wet etch that is used to expose sensor portions of the waveguides, as shown below. The nitride etch stop 335 provides etch control for a wet etch that is used to expose sensor portions of the waveguides, as shown below. In one embodiment the nitride etch stop 335 remains on the waveguides 315a and serves to expand the waveguide transmission capacity, which further enhances data collection from the analyte.

Figure 3F:
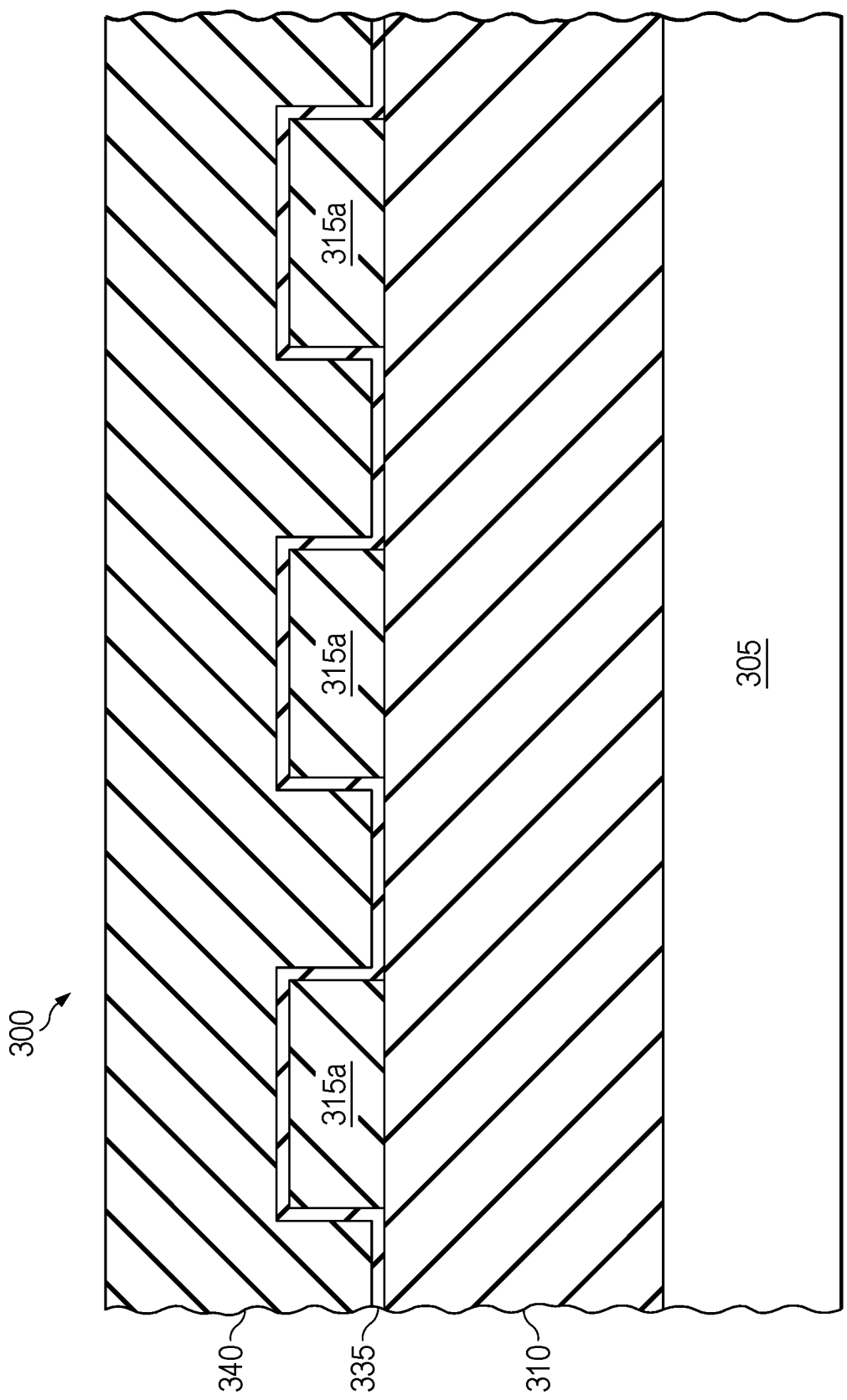

FIG. 3F illustrates the intermediate device of FIG. 3E after the deposition of a silicon oxide layer 340, using known deposition processes. The thickness of the silicon dioxide layer 340 may vary, but in one embodiment, the thickness may be about 2 microns. Also, the silicon oxide layer 340 serves as a cladding layer for at least a portion of the waveguides 315a, as explained below.

Figure 3G:
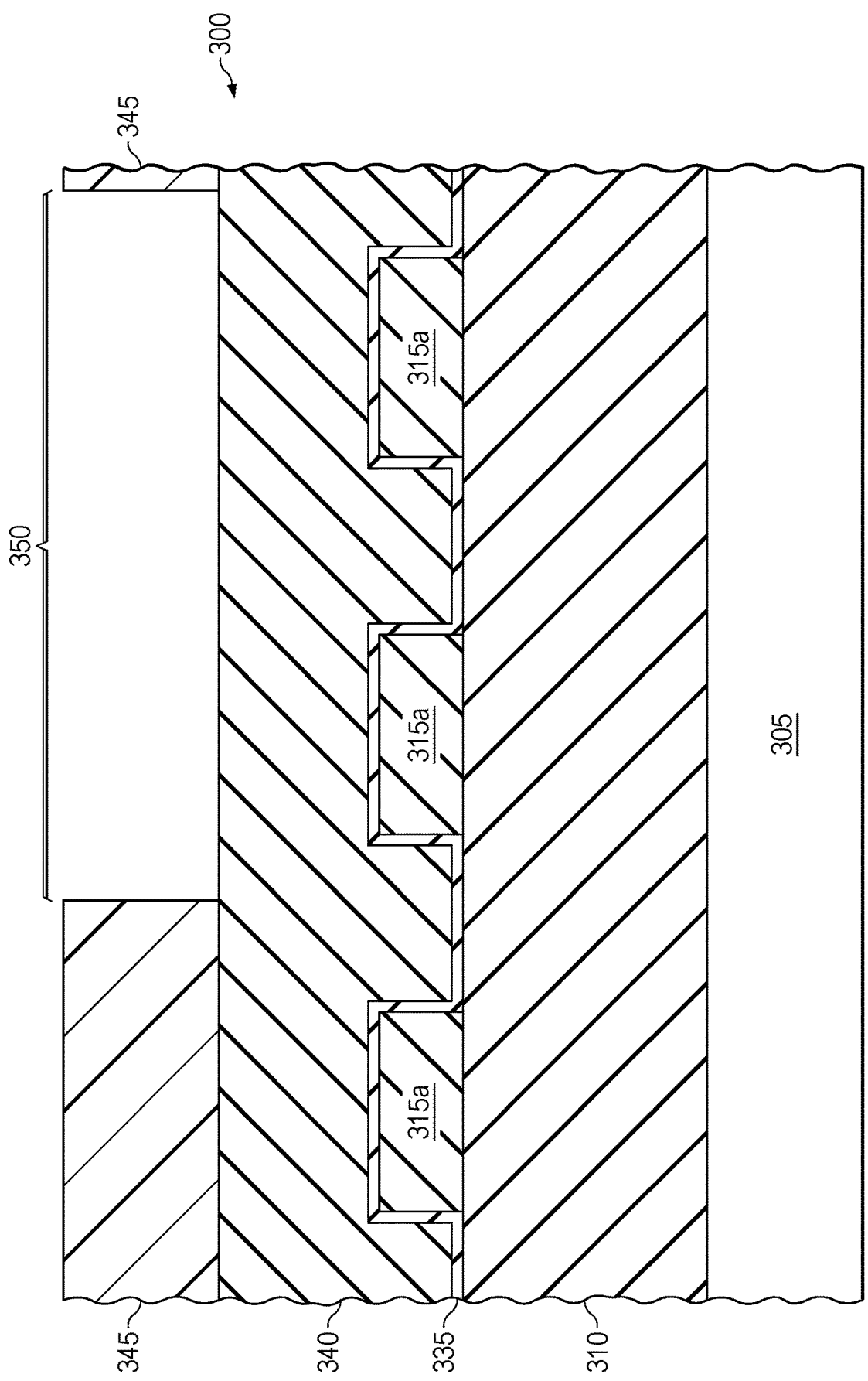

FIG. 3G illustrates the intermediate device of FIG. 3F after the deposition and patterning of a photoresist 345 to form a sensor opening 350 in the photoresist 345. The sensor opening 350 exposes a region of the silicon oxide 340 to a subsequent etch that will remove the silicon oxide from portions of the waveguide, resulting in uncladded waveguides 315a on which the nanoparticles will be deposited and used to collect data from the subject analyte. A known basic wet oxide etch may then be conducted to remove the silicon oxide cladding over targeted waveguides, which results in the intermediate structure, as seen in FIG. 3H. As shown in FIG. 3H, a portion of the waveguides 315a remains cladded by the silicon dioxide 340, while another portion is uncladded. These uncladded portion serve as sensor regions that are used to collect data regarding the subject analyte.

Figure 3I:
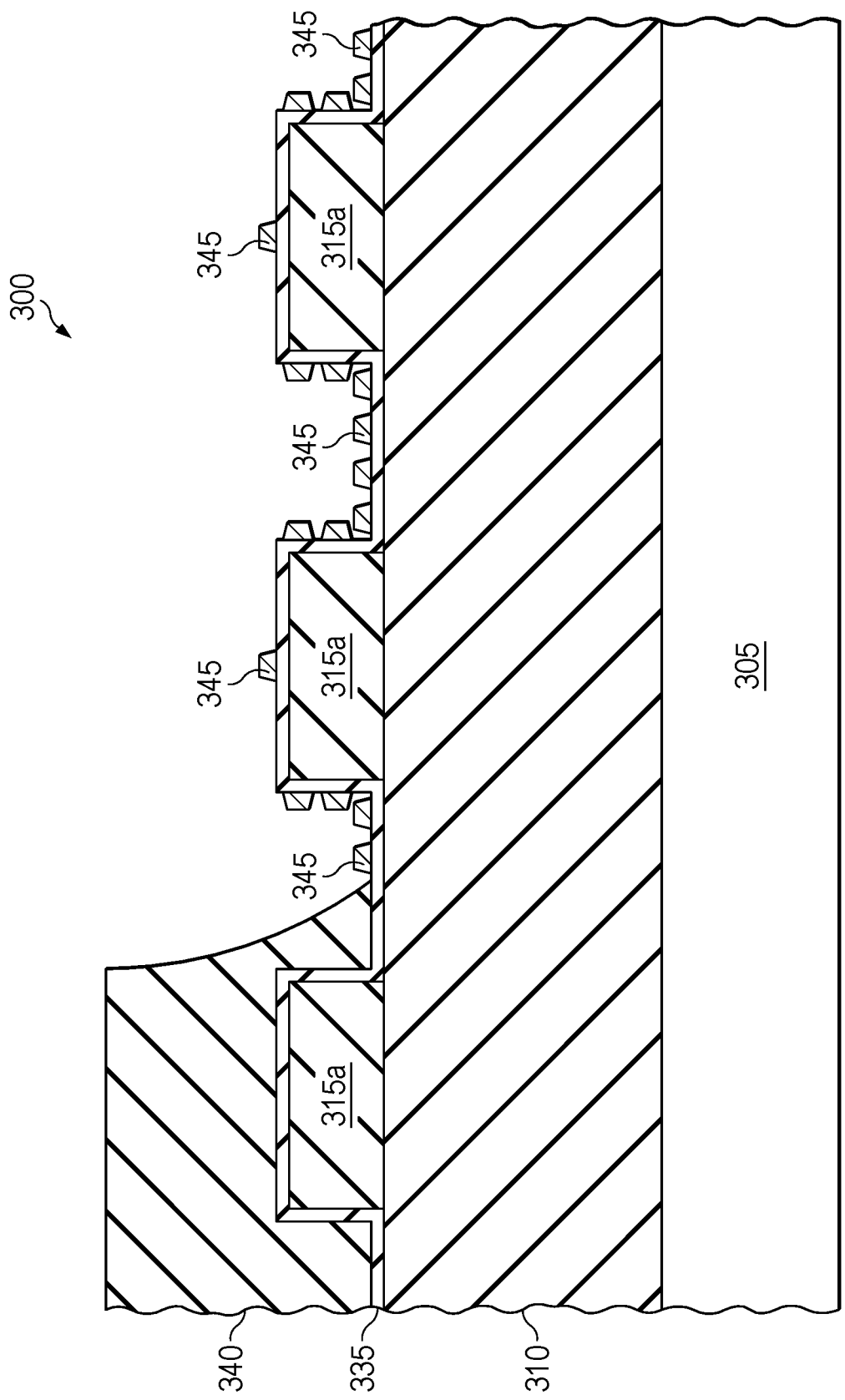

FIG. 3I illustrates the intermediate structure, as seen in FIG. 3H, after the formation of the nanostructures 345 on the exposed waveguides 315a. In some embodiments, the nanostructures 345 may have a diameter that ranges from about 70 nm to about 100 nm on about 140 nm to 300 nm pitch. However, other ranges and pitches can be used to optimize the performance of the device. Different deposition processes may be used to deposit the nanostructures 345. For example, in one embodiment, the nanostructures 345 may be deposited using an inkjet deposition processes. In another embodiment, the nanostructures 345 may be deposited using deep ultraviolet (DUV) photolithography or e-beam lithography with metal deposition liftoff. In such embodiments, the thickness of the liftoff structures may range from about 40 nm to about 80 nm, depending on the mean diameter.

FIGS. 4A-4H illustrate partial cross-sections of intermediate structures 400 of one embodiment of a process flow for fabricating the above-mentioned microfluidic channel 230 in a wafer that is bonded to the wafer on which the photonic integrated circuit and waveguide 205 are formed. Once bonded together, the microfluidic channel 230 forms a sealed fluidic channel around the side surfaces and outermost surface of the waveguide(s) as seen in FIG. 2. In one embodiment, the microfluidic channel 230 comprises two levels, a shallow etched structure, and a deeper etched structure, as discussed below. The shallow etch supports lateral capillary flow, while the deeper etch structure provides vent and feed ports that are exposed during a post back-side grind.

Figure 4A:
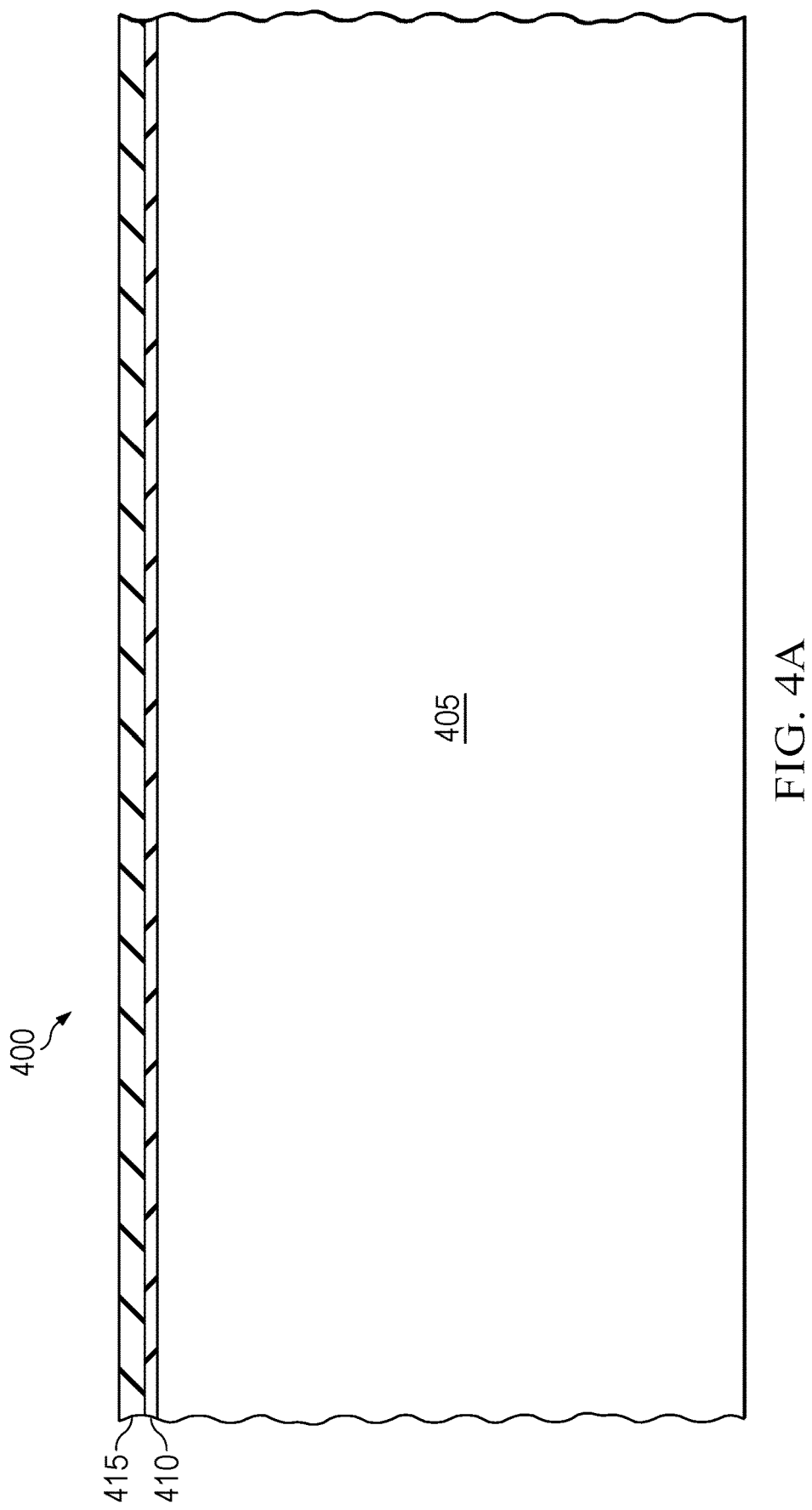

FIG. 4A illustrates a wafer 405, which, in one embodiment, may be a 200 mm silicon wafer that is doped with a known P-type dopant, whose concentration and diffusion depth may vary depending on optimized design requirements. A pad oxide 410 is formed over the silicon wafer 405 using known processes, such as oxidation growth or deposition processes. The thickness of the silicon oxide layer 410 may wavy. For example, the thickness may be about 100 nm or 30 nm to 50 nm under wet etch conditions. A silicon nitride layer 415 is formed over the oxide layer 410, and in certain embodiments, its thickness may be about 300 nm. The silicon nitride layer 415 is the hard mask feature for the shallow trench etch. The oxide layer 410 provides isolated removal of the silicon nitride 415 layer in subsequent steps.

Figure 4B:
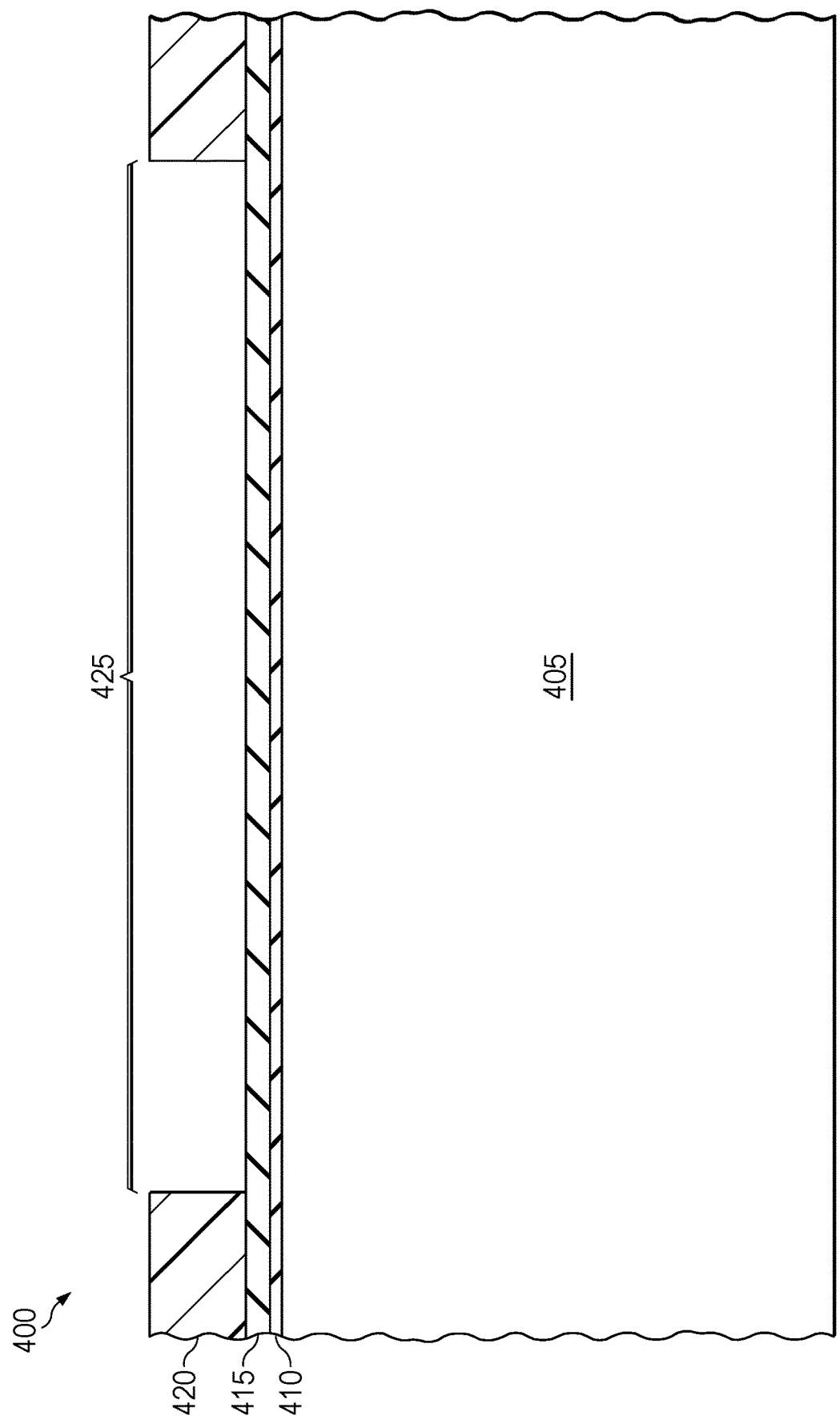

FIG. 4B illustrates the intermediate device of FIG. 4A following a known photoresist deposition, development, and strip process that results in a patterned photoresist 420. The patterned patterned photo resist 420 exposes a trench region 425 that will be subsequently etched.

Figure 4C:
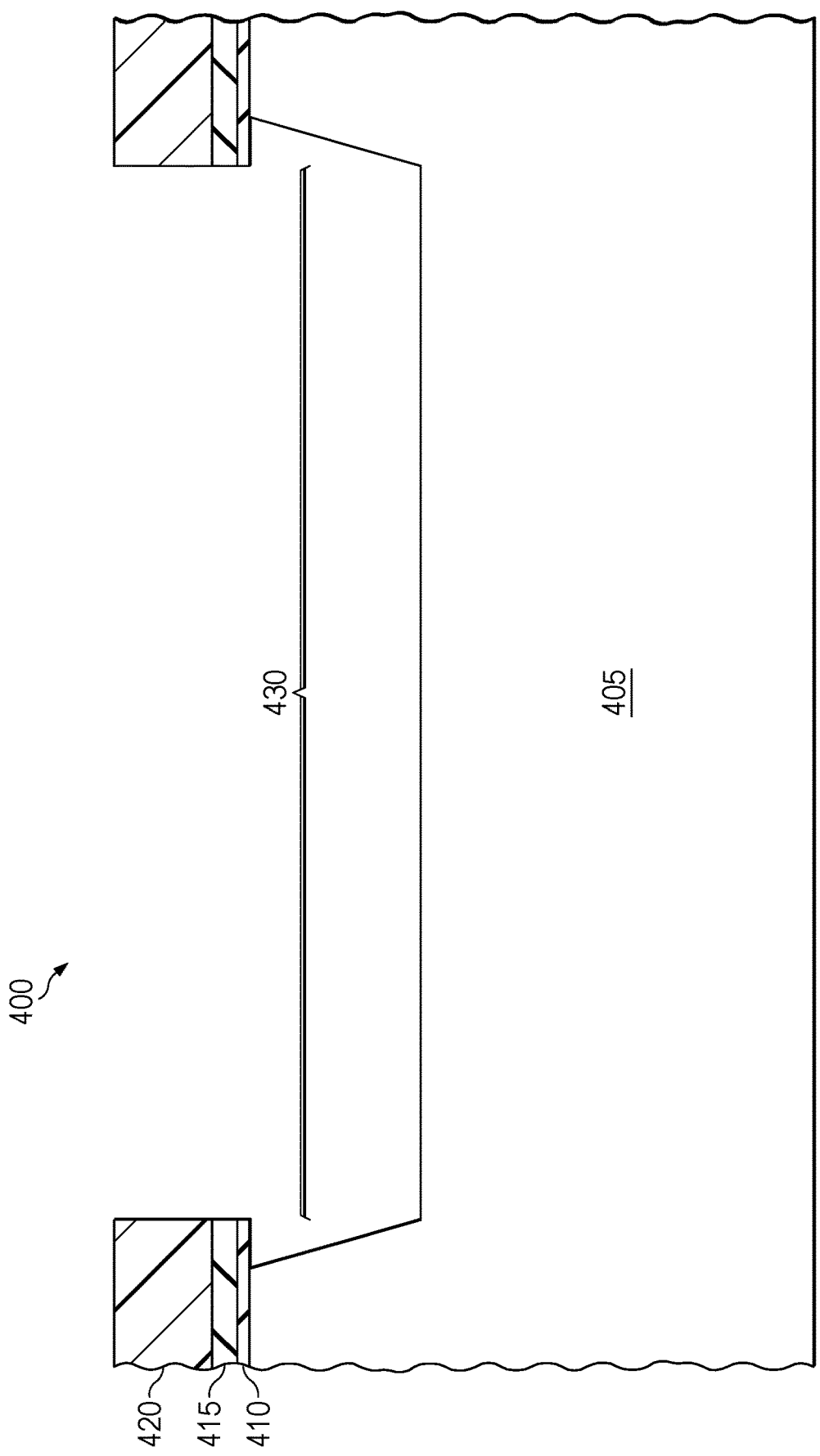

FIG. 4C illustrates the intermediate device of FIG. 4B following a known hard mask etch process, which may be either a wet or dry etch, that forms a shallow trench 430. The etch depth may vary, but in certain embodiments, the etch depth may be 3 to 6 microns. As seen, the etch undercuts a portion of the oxide layer 410 and the silicon nitride layer 415. The patterned photoresist 420, though shown, may be removed before the etch is conducted. After the etch, the silicon nitride layer 415 and oxide layer 410 are removed using known strip and cleaning processes, resulting in the intermediate device of FIG. 4D.

Figure 4D:
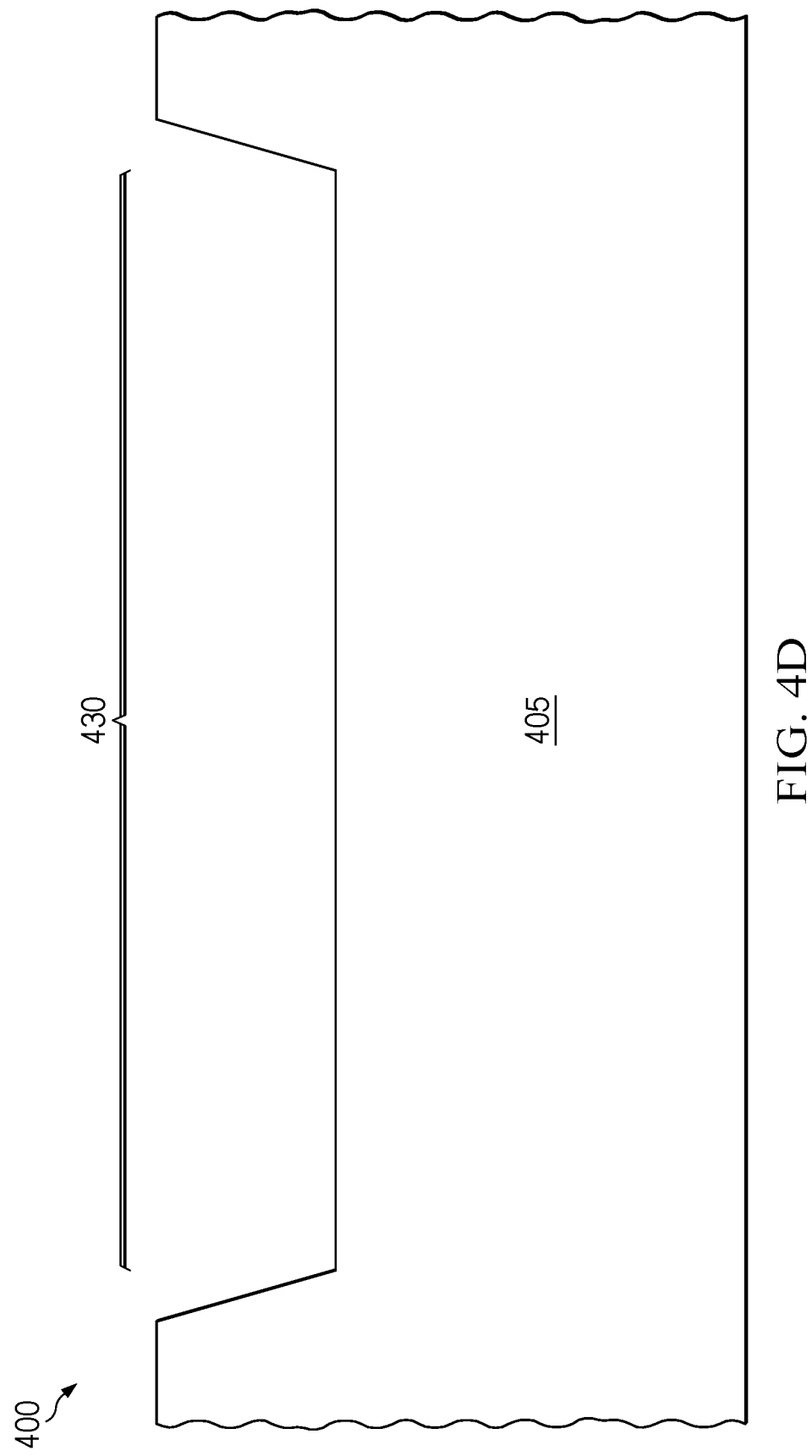
Figure 4E:
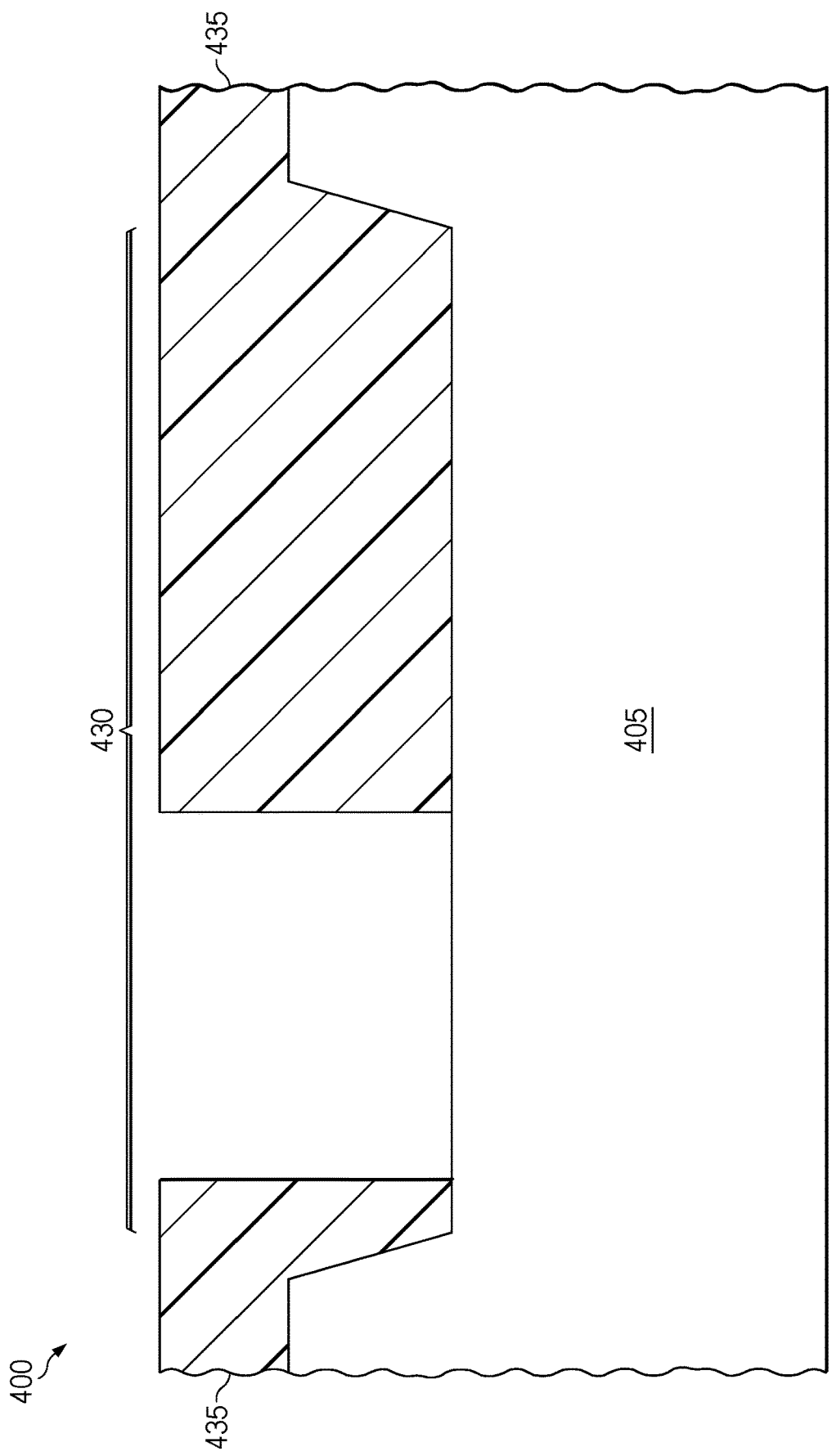
Figure 4F:
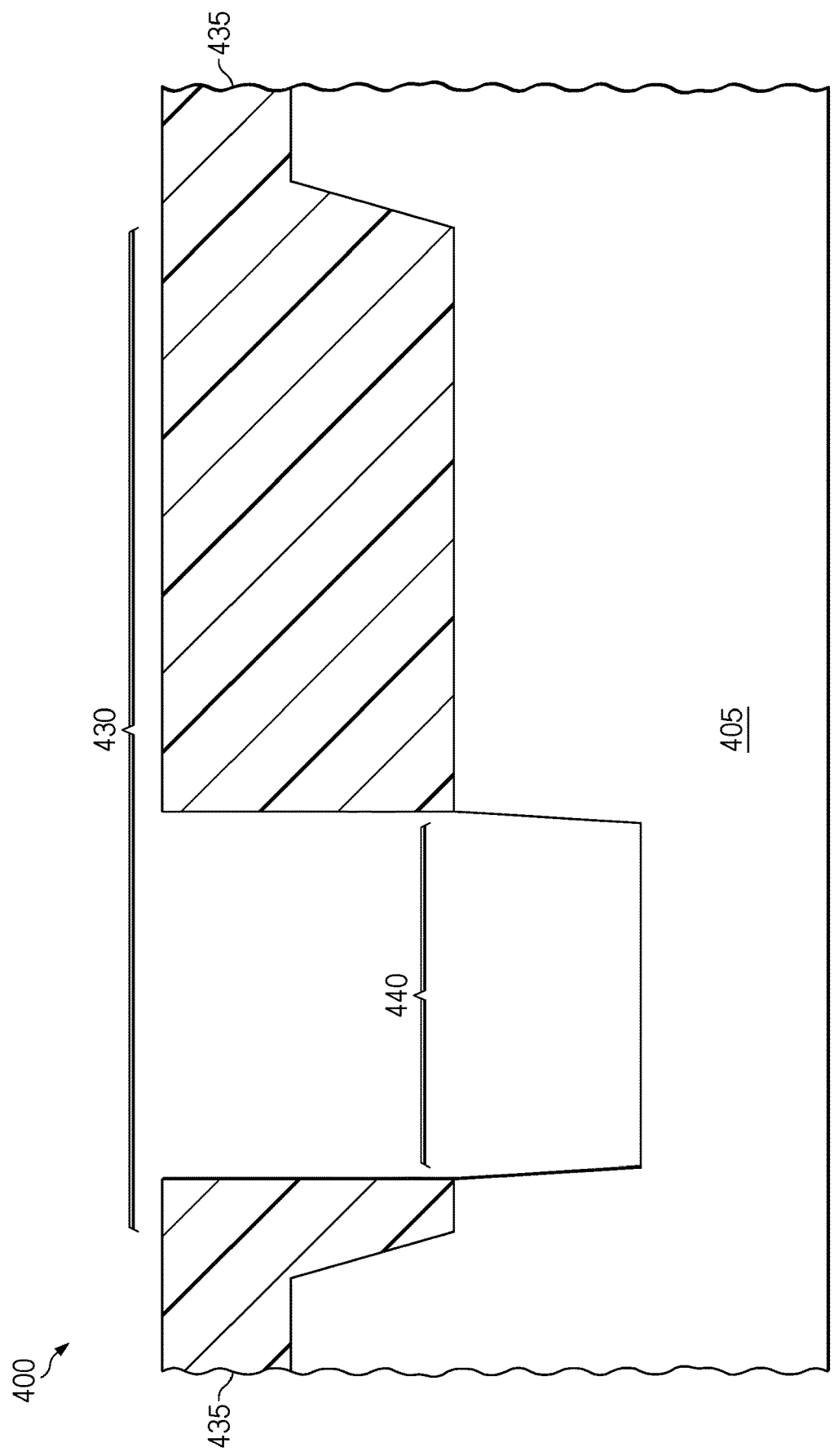

FIG. 4E illustrates the intermediate device of FIG. 4D following the deposition and patterning of a photoresist layer 435 within the shallow trench 430 that will be used to form a deeper trench. In one embodiment, a deep reactive ion etch process, such as a BOSCH etch process, may be used to etch a deep trench 440 to a depth of about 200 microns, resulting in the intermediate structure shown in FIG. 4F. Following the etch, a known strip resist ash process is conducted, flowed by a clean process, resulting in the intermediate structure shown in FIG. 4G that includes the shallow trench 430 and deep trench 440.

FIG. 4H illustrates the intermediate device of FIG. 4G following the removal of the photoresist and the formation of an oxide layer 445, which, in one embodiment, may be grown to a thickness ranging from about 75 nm to about 100 nm, though other thickness may be used to optimize device performance. As mentioned above, in those embodiments where a driving electrode is present, an electrode may be deposited in the bottom of the trench, or an implant may be performed to form a highly conductive region in the exposed silicon in the bottom of the deep trench 440.

Following the cleaning of the intermediate structure shown in FIG. 4H, the silicon wafer 405 with the shallow trench 430 and deep trench 440 formed therein is flipped and bonded to the photonic substrate, resulting in the general structure shown in FIG. 2.

Figure 5A:
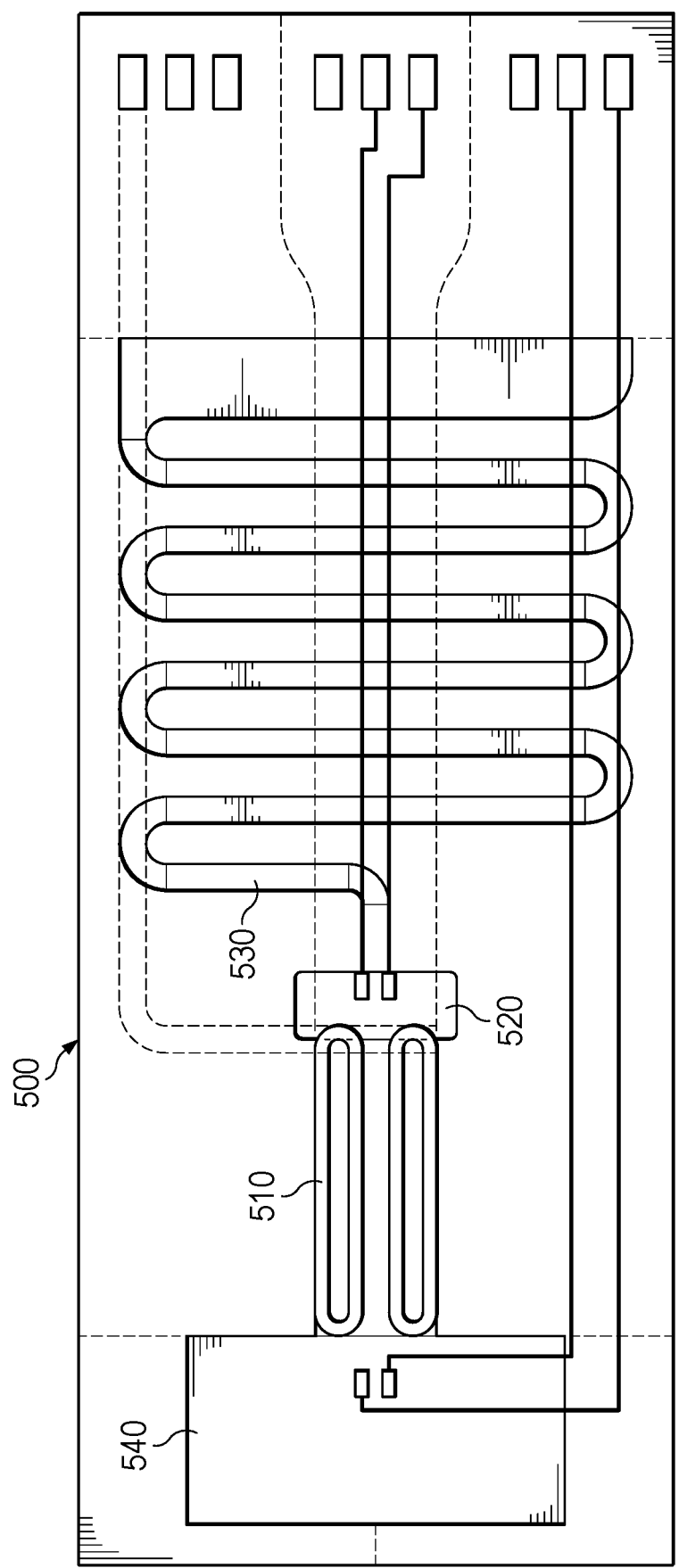
FIGS. 5A-5B illustrate embodiments of a microfluidic pump that may be fluidly coupled to the microfluidic channel.
Figure 5B:
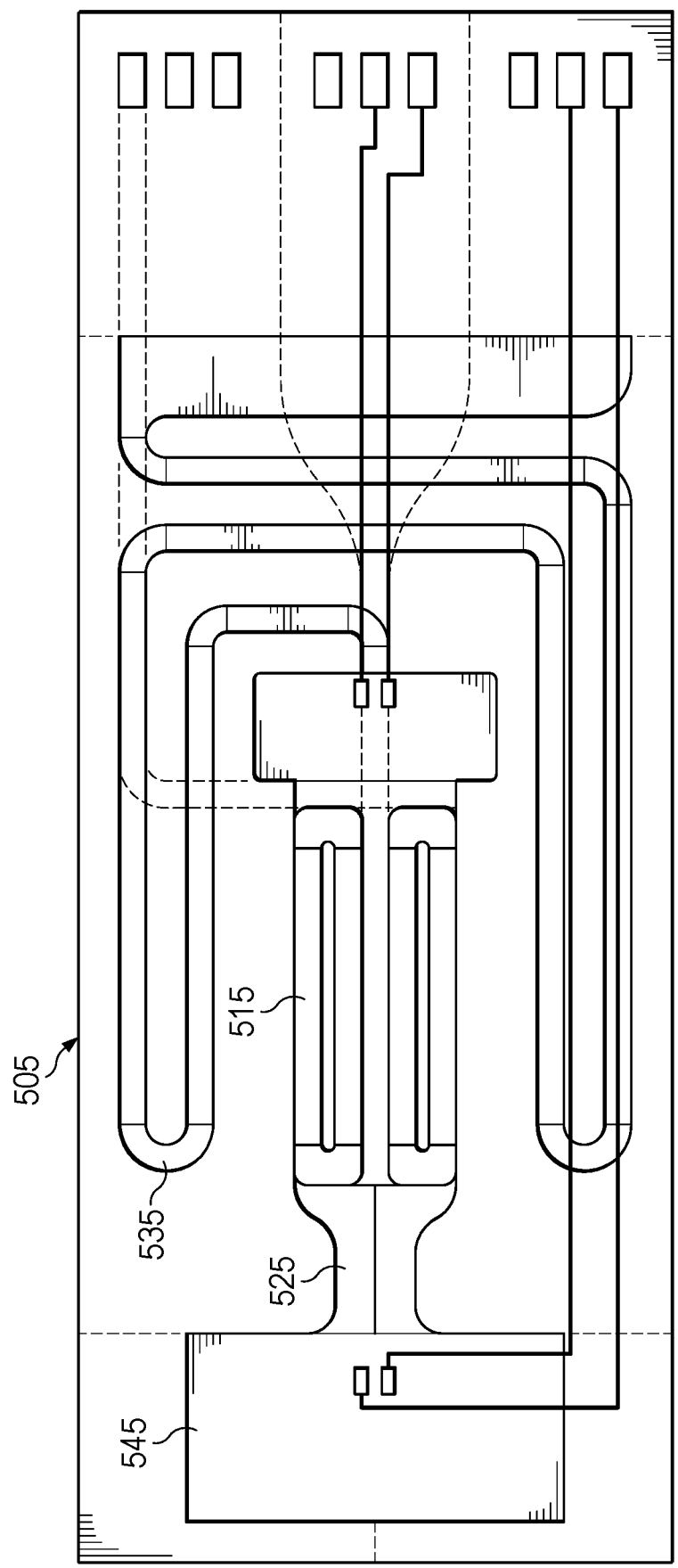

In one embodiment, the microfluidic channel 230 may be fluidly coupled to a microfluidic pump 500, 505, which are just two illustrative embodiments. FIGS. 5A-5B show examples of a couple of embodiments, but the microfluidic pumps 500, 505 may be designed as any number of serpentine configurations, as generally illustrated by FIGS. 5A and 5B. As seen in FIGS. 5A-5B, the enhanced/modified waveguides 510, 515 and their associated microfluidic channels 520, 525 and microfluidic pumps 530, 535 may have several geometrical configurations that can be used to optimize the length of the respective waveguides 510, 515 for a particular application. However, depending on design parameters, in some embodiments, the microfluidic channels 520 525 may not have an associated microfluidic pump. For example, if design parameters so require, the length of the enhanced/modified waveguide 510, 515 and microfluidic channel may be sufficiently short so as not to require a microfluidic pump. In other embodiments where design parameters require, the enhanced/modified waveguide 510, 515 and associated microfluidic channel 520, 525, respectively, may be longer or more complex as seen in FIGS. 5A-5B. In such embodiments, the microfluidic pump 530, 535 is present. The analyte is introduced into the microfluidic channel 520, 525, through the fluid input port 540, 545. The microfluidic pumps 530, 535, when present, can operate on a capillary principle to help draw the fluid through the microfluidic channel and over the waveguide so that maximum data can be obtained from the test sample. However, in other embodiments, the microfluidic pumps 530, 535 may be mechanically driven to pump the test fluid through the microfluidic channel. For example, the microfluidic pump may comprise a piezoelectric material that can be used to move the test fluid though the microfluidic channel. The length and geometric configuration of the microfluidic channels 530, 535 may vary and will be depend on design parameters and system requirements. In the illustrated embodiments, the microfluidic channels 520, 525, and microfluidic pumps 530, 535 have a general serpentine configuration, but as just mentioned, other geometric configurations are within the scope of this disclosure. These folded types of pathways can be used to increase the data collection length of the device, while keeping the device exceptionally small for a compact form. Known photolithographic processes and materials may be used to fabricate the microfluidics channel.

Figure 6:
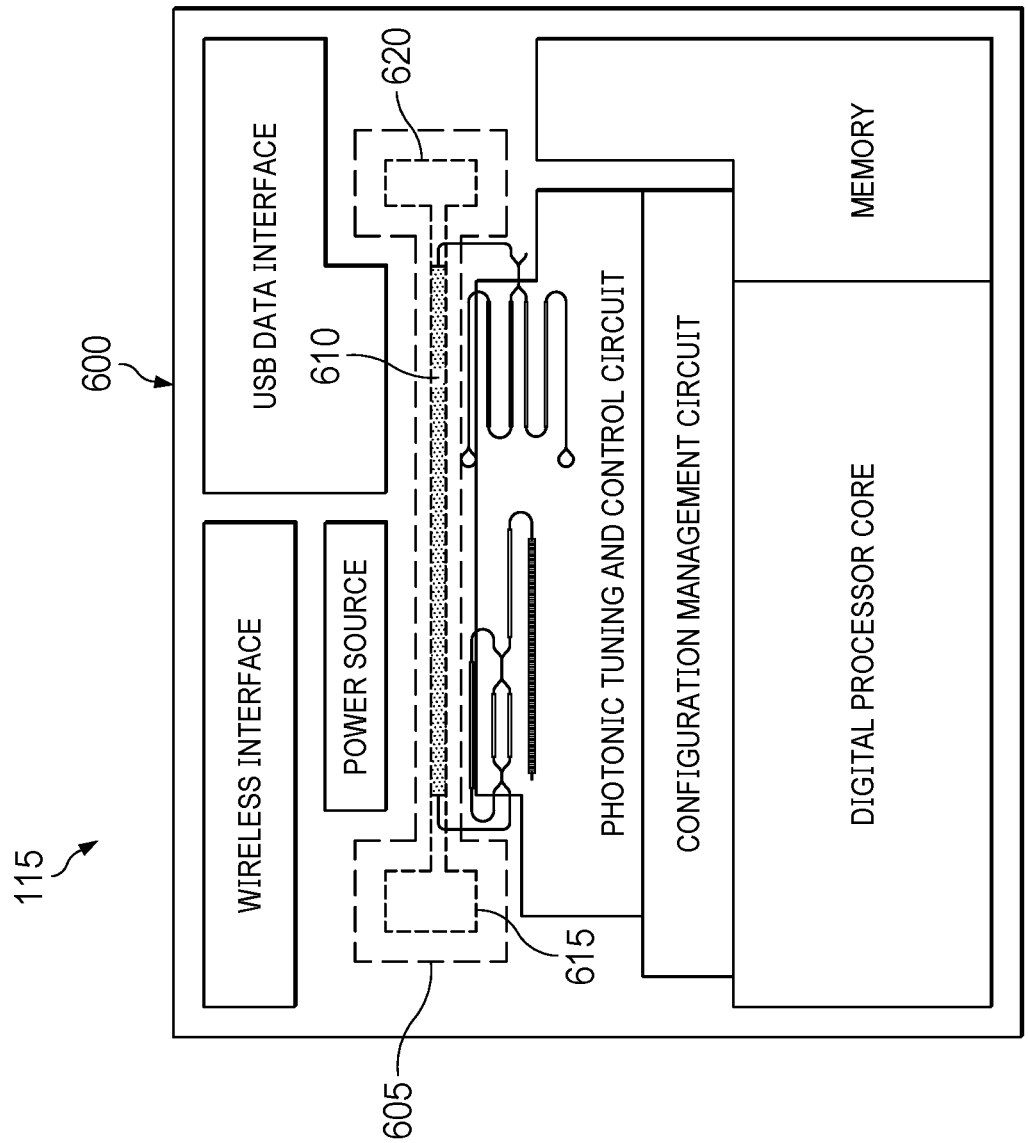
FIG. 6 illustrates a block diagram layout of one embodiment of the test chip.

FIG. 6 illustrates a general block diagram layout of one embodiment of the integrated photonic chip 115. This embodiment comprises a photonic tuning and control circuit 600 that includes an interferometer for signal extraction and a stabilized optical source, as discussed below, a configuration management circuit, digital processor core, memory, a USB data interface, a power source, and a known wireless interface for quick and easy transmission of the data. The analyte enters the microfluidic channel 605 through the input port 615. As the fluid travel through the microfluidic channel 605, quantitative or qualitative data is produced by the interactions between the evanescent field of the light in the waveguide 610, the nanoparticles, and the analyte in the fluid. The fluid travels through the microfluidic channel and exits through a vent port 620 and back into the fluid channel of the test strip, as discussed above. Thus, this disclosure presents a micro-sized photonic integrated circuit that provides accurate fluidic analysis with rapid results.

Figure 7:
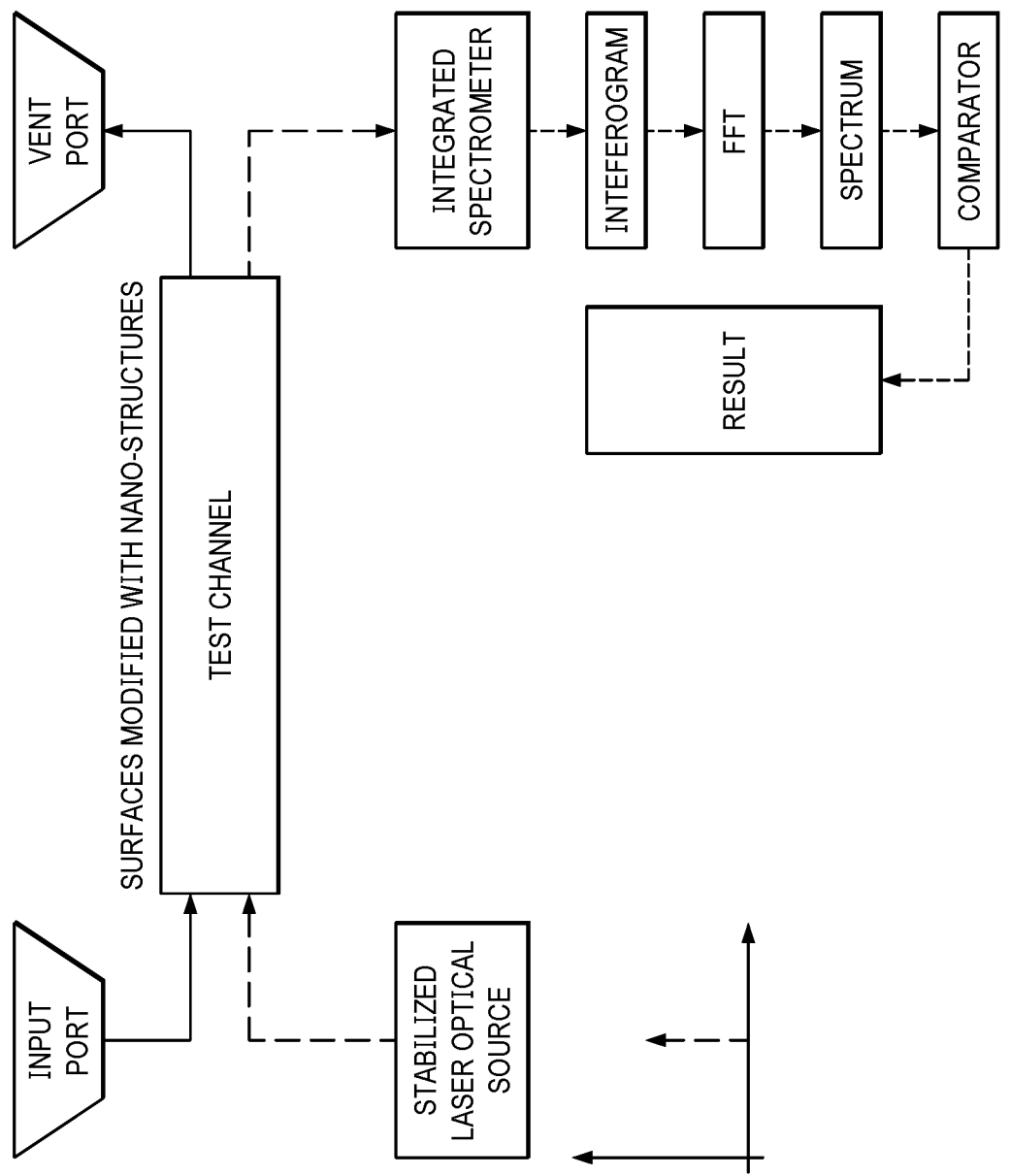
FIG. 7 illustrates a general block diagram layout of an embodiment showing the integration of the various components within the test chip.

FIG. 7 illustrates a general schematic overview configuration of one embodiment of the waveguide enhanced analyte detection apparatus. In this embodiment, the photonic integration is combined with microfluidics and additive manufacturing to quickly implement a compact Raman Spectroscopy based system to provide rapid detection and identification of pathogens or other biochemical or non-biochemical substances.

As mentioned above, one embodiment of this disclosure uses Raman spectroscopy, though other similar types of spectrometers may also be used. Raman spectroscopy is a known technique in which incident laser light is inelastically scattered from a sample and shifted in frequency by the energy of its characteristic molecular vibrations. The Raman spectrum provides high informational content on the chemical structure of the probed substances, which makes this method an ideal tool for the identification of viruses and bacteria, illicit drugs, pharmaceutical and drug manufacturing monitoring/validation or cancer cell detection and identification. However, unlike focusing the Raman beam on a single point on a surface containing a targeted subject matter, as done in conventional systems, the embodiments of this disclosure provide for a structure that collects data along the length of the waveguide or waveguides, thereby greatly enhancing the quantity and accuracy of the data.

The test analyte or fluid is injected into the microfluidic channel that provides confinement of the analyte under test. This confinement ensures the greatest overlap of the analyte with the probe beam. Further, it provides intimate and strong interaction of the molecules with nanostructures along the walls of the microfluidic channel, which provides enhanced Raman Signal strength.

The application of Surface-enhanced Raman spectroscopy (SERS), to improve signal strength is a modification of Raman spectroscopy. It has been demonstrated as a very capable approach to identify biomolecules, such as a bacterium or viruses. It is based on the enhancement of the Raman scattering signal of certain molecules when they are adsorbed or placed in the proximity of appropriate metallic nanostructures, usually noble metals, such as silver, gold, or copper. It has been shown that the SERS approach can yield enhancement factors as large as $10^{14}$-$10^{15}$, leading to Raman scattering cross sections larger than those of fluorescent organic dyes or other reagents used in modern test sets or detection panels.

Figure 8:
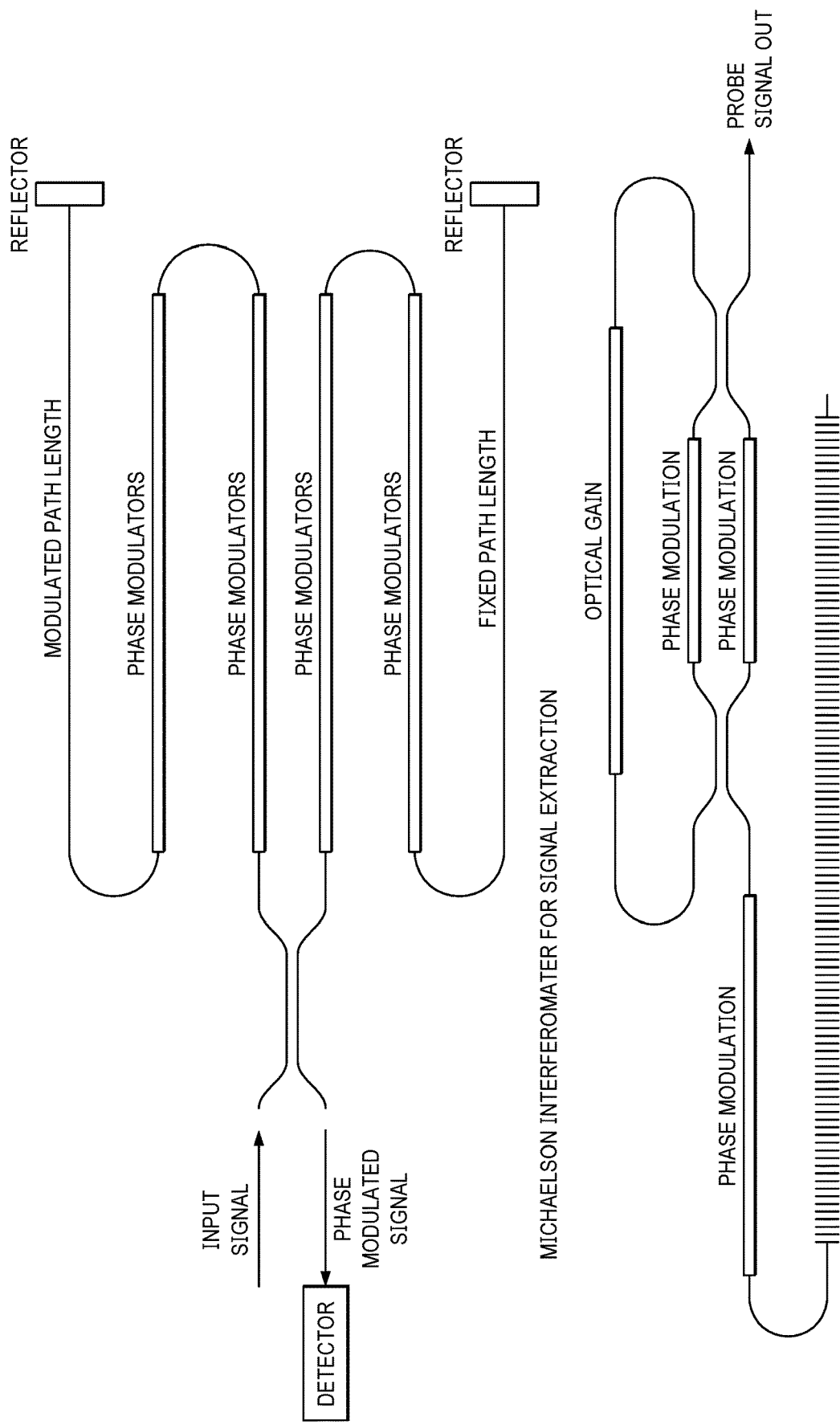
FIG. 8 illustrate embodiments of an interferometer and stabilized optical source.

The embodiments of this discloser detect the Raman spectrum from the SERS interactions using a detector coupled with an interferometer, such as a Michaelson interferometer, as generally shown in FIG. 8, which schematically illustrates an embodiment of an interferometer, such as a Michaelson Interferometer, and a stabilized optical source that form portions of the photonic integrated circuit of the integrated photonic chip 115. This unique approach generates an interferogram that contains the frequency dependent information modulated in a time domain as a function of the phase propagation length variation in one arm of the spectrometer. The system will then perform a Fourier-transform to extract the detailed Raman spectrum used to detect and identify viruses present in the sample.

The photonic integrated circuit Fourier-transform (FT) spectrometer generates its output spectrum by modulating the radiation in the time domain through interference, which then undergoes a Fourier transformation. The detection and identification of pathogens is insured by the ability to integrate 6 elements into a relatively small area, such as the illustrated test chip, by leveraging semiconductor manufacturing and packaging techniques. These include: 1) the stabilized narrow band optical source to provide a controllable Raman Probe; 2) The evanescently coupled low index contrast waveguides providing controlled overlap of the modal energy traveling external to the waveguide and the metallic nanostructures which provide the photonic enhancement of the Raman Scattering; 3) Formation of nano structures between and on the waveguides providing a controlled surface region for characterization of a pathogen; 4)The integration of electrodes which allow controlled enrichment of the target pathogen at the metallic nanostructure surface; 5) The Integration of microfluidic structures to confine the sample volume relative to the waveguides and enrichment structures; 6)The ability to integrate a small Fourier transform spectrometer.

The interference between the signal propagating along the phase modulated arm, and the non-phase modulated arm are reflected to the coupler where the variation in phase causes an amplitude change. When this recorded, time-based amplitude information is recorded against the driving voltage or resulting effective path length variation in the modulated arm, it is called an interferogram, I(xeff). This Interferogram represents a modulated radiation signal as a function of the change in effective path length between the two arms of the interferometer. In the interferometric photonic circuit, the analog signal is recorded at a photodetector, which encodes the wavelength or the wave number information of the encoded Raman spectrum. A Fourier-transform routine is then performed on the interferogram to recover the Raman spectrum. An advantage of this system is the photonic integrated circuit, stabilized optical source. In one embodiment, a resonant cavity is used to define the initial gain distribution which is stabilized relative to the external cavity and composed of a Bragg mirror and phase tuner. This approach allows the control over the phase and frequency content of the signal being reinjected for injection locking of the resonant gain stage.

In the operation of one embodiment, the test fluid is placed into the microfluidic channel through an input port. A stabilized optical source, such as a laser, is then guided within the waveguide that is formed along at least a partial length of the microfluidic channel. Since the region where the channel and optical waveguide is relatively long, and the evanescently guided region around or between the waveguide will interact with a larger number of target analytes, an increase can be obtained through the summation of the interactions, thereby enhancing the accuracy of the test. At the end of the sensor region, the optical signal is then input into an integrated spectrometer that measures properties of light over the specific portion of the electromagnetic spectrum associated with the subject molecule or pathogen. These spectrometers may take the form of a wide range of integrated structures, from resonator coupled detectors to scanned structures such as Mach-Zehnder and Michaelson interferometers. The approach shown details the use of an integrated Michaelson Interferometer, whereby the phase induced propagation variation in one arm, versus the fixed length of a reference arm, introduces an interference pattern interferogram, which is then transmitted to an internal or external processor. This is then, by means of a Fast Fourier Transform (FFT), converted to the spectrum from which a unique fingerprint, consisting of unique peak positions, widths, and shapes, can be processed by a comparator to obtain the final data set. The final data set can be transmitted to a detectable format, such as a visual signal or alphanumeric readout.

Figure 9:
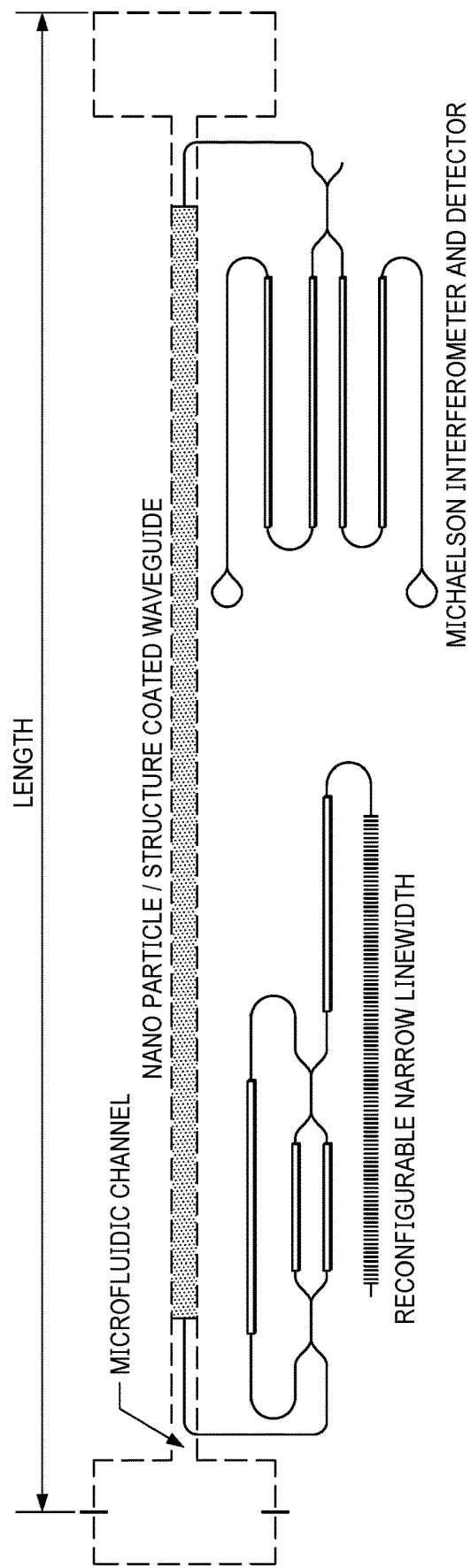
FIG. 9 illustrates a schematic layout of the cooperative coupling of the interferometer and stabilized optical source with the waveguide.

FIG. 9, schematically illustrates how, in one embodiment, the interferometer and stabilized optical source are optically coupled to the waveguide, which may have an overall length, including the fluid input and vent ports between about 3 mm to about 4 mm and where the line width source ranges from about 0.5 mW to about 5 mW.

Figure 10:
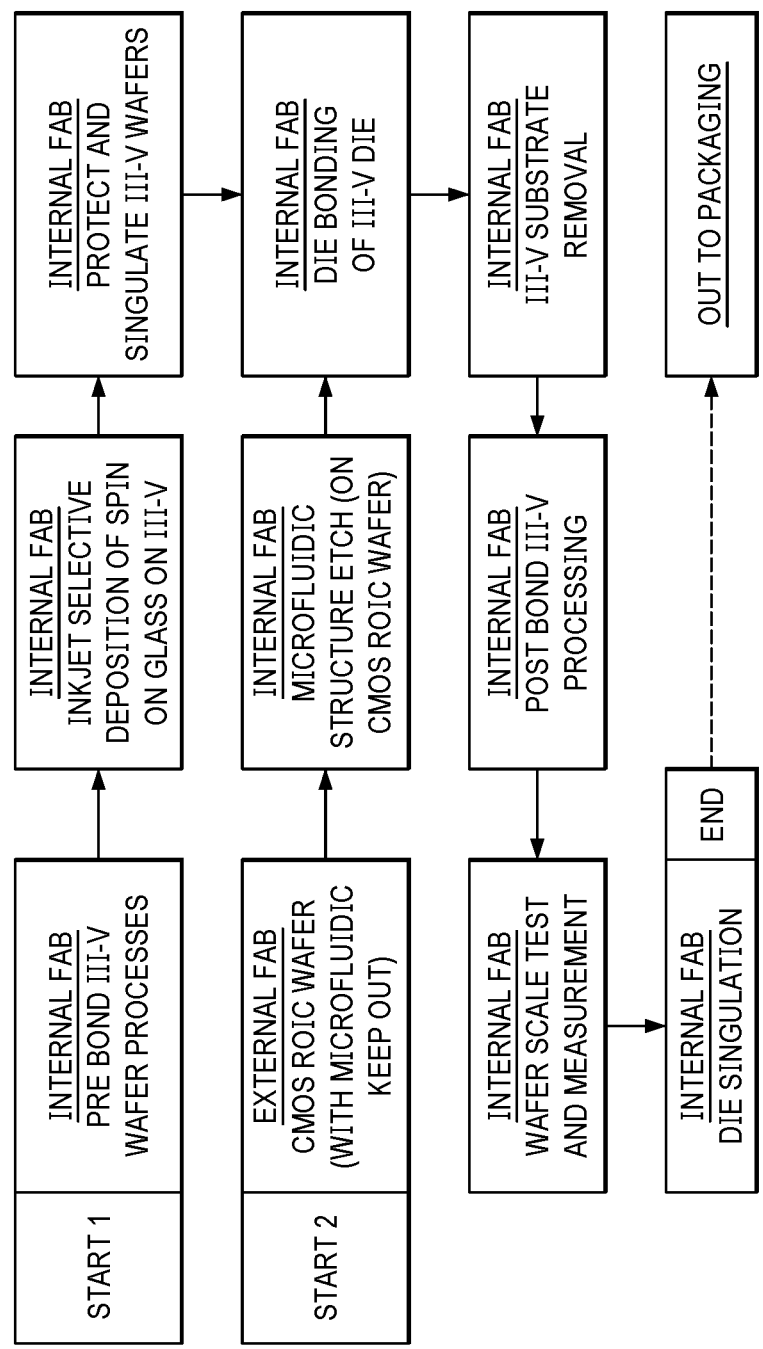
FIG. 10 illustrates a flow chart of one embodiment of certain method steps that can be used to fabricate the test chip, as generally illustrated in FIG. 1.

FIG. 10 illustrates an embodiment of a general fabrication process flow that can be used to fabricate the test chip.

The unique benefits of the various embodiments of the test strip detection and identification system include the ability to confine solutions that contain viral materials to a microchannel. This confinement provides improved interaction between the probe light beam and target materials. The embodiments herein provide a compact analytical system having multiple orders of magnitude improvement in sensitivity over any other approach, for example, it is believed that 14 to 15 orders of magnitude increase in signal sensitivity that results from application of metallic nano structures along the walls of the microchannel is possible. The forced interaction with the multiple surfaces of the nanoparticles within the microchannel increases the overall interaction length and accumulated signal strength. Other advantages provided by the embodiments herein, include low-cost generation, coupling, transmission, processing and detection of the Raman spectrums, application of microchannel integration technologies to support the formation of the localized metallic nanostructures within the channels and their integration with the photonic integrated circuits, and the supporting elements to control injection of the probe light beam into the microchannel. This system allows guidance of the probe beam in a controlled manner through the microchannel and re-coupling of the probe beam back into the photonic circuit for processing and spectrum extraction. The embodiments herein also provide packaging of the sensor into a useable vehicle to allow isolated, real-time single point testing without putting additional persons at risk.

Embodiments disclosed herein comprise:

In one embodiment a photonic integrated chip is disclosed. In this embodiment, the photonic integrated chip comprises an optical waveguide located on a photonic circuit substrate comprising a photonic circuit. The optical waveguide is optically coupled to the photonic circuit. A microfluidic channel is in a silicon substrate and electrically and optically coupled to the photonic circuit substrate, wherein the microfluidic channel is positioned over the optical waveguide. Side surfaces and an outermost surface of the optical waveguide extend into the microfluidic channel. The microfluidic channel extends along a length of the optical waveguide. Nanoparticles located on or adjacent the optical waveguide is located within the microfluidic channel.

Another embodiment is directed to a test strip. This embodiment comprises a photonic integrated chip. The photonic integrated chip comprises an optical waveguide located on a photonic circuit substrate comprising a photonic circuit. The optical waveguide is optically coupled to the photonic circuit. A microfluidic channel is in a silicon substrate and attached to the photonic circuit substrate, wherein the microfluidic channel is positioned over the optical waveguide. Side surfaces and an outermost surface of the optical waveguide extend into the microfluidic channel and the microfluidic channel extends along a length of the optical waveguide. Nanoparticles located on or adjacent the optical waveguide located within the microfluidic channel. The integrated photonic chip is located on and a fluid collection strip and adjacent one of its ends. The fluid collection strip has a fluid channel formed therein and a fluid input port fluidly connected to the fluid channel. The fluid input port is located adjacent an opposing end of the fluid collection strip, and a vent port is fluidly connected to the fluid input port of the integrated photonic chip to allow a flow of fluid from the fluid channel and into the microfluidic channel of the integrate photonic chip.

Element 1: further comprising, a driving electrode and a backing electrode, wherein the driving electrode is in the silicon substrate and the driving electrode is in the photonic circuit substrate, the optical waveguide located between the driving electrode and the backing electrode positioned over the optical waveguide.

Element 2: wherein the photonic integrated circuit comprises a photonic tuning and control circuit, a configuration management circuit, a digital processor core, a memory circuit, a digital interface, and a Bluetooth interface.

Element 3: further comprising a fluid input port and a fluid vent port located on opposing ends of the microfluidic channel, the microfluidic channel forming a fluid path between the fluid input port and the fluid vent port.

Element 4: further comprising an optical stabilizer and an interferometer comprising a modulated path length for an input signal and a fixed path length for a phase modulated output signal.

Element 5: wherein the optical stabilizer comprises an optical gain circuit, and a phase modulation optical circuit coupled to a Bragg mirror.

Element 6: wherein a concentration of the nanoparticles is greater on or adjacent the side surfaces than on the outermost surface.

Element 7: wherein a portion of the waveguide is uncladded, and the nanoparticles are on or adjacent the uncladded waveguide.

Element 8: wherein the waveguide has a serpentine configuration.

Element 9: further comprising a microfluidic pump fluidly connected to the microfluidic channel.

Element 10: wherein the integrated photonic chip further comprises, a driving electrode and a backing electrode, wherein the driving electrode is in the silicon substrate and the driving electrode is in the photonic circuit substrate, the optical waveguide located between the driving electrode and the backing electrode positioned over the optical waveguide.

Element 11: wherein the photonic integrated circuit comprises a photonic tuning and control circuit, a configuration management circuit, a digital processor core, a memory circuit, a digital interface, and a Bluetooth interface.

Element 12: further comprising an optical stabilizer and an interferometer comprising a modulated path length for an input signal and a fixed path length for a phase modulated output signal.

Element 13: wherein the optical stabilizer comprises an optical gain circuit, and a phase modulation circuit optical coupled to a Bragg mirror.

Element 14: wherein a concentration of the nanoparticles is greater on or adjacent the side surfaces than on the outermost surface.

Element 15: wherein a portion of the waveguide is uncladded, and the nanoparticles are located on or adjacent the uncladded waveguide.

Element 16: wherein the waveguide has a serpentine configuration.

Element 17: wherein a portion of the waveguide is uncladded, and the nanoparticles are located on or adjacent the uncladded waveguide.

Element 18: wherein the fluid collection strip comprises a top film on which the integrated photonic chip is located, a bottom film, and a spacer film, the top and bottom films and the space film being attached together to form the fluid channel.

Although the present invention has been described in detail, those skilled in the art should understand that they can make various changes, substitutions, and alterations herein without departing from the spirit and scope of the invention in its broadest form.

What is claimed is:

1. A test strip, comprising:
   an integrated photonic chip, comprising, an optical waveguide located on a photonic circuit substrate, a photonic circuit, comprising a laser optically coupled to the optical waveguide to input light into the waveguide, an interferometer optically coupled to the optical waveguide for receiving the light from the waveguide, and a photodetector positioned with respect to the interferometer to receive the light from the interferometer;
   a microfluidic channel located in a silicon substrate and attached to the photonic circuit substrate and positioned over the optical waveguide, such that side surfaces and an outermost surface of the optical waveguide extend into the microfluidic channel, and wherein the microfluidic channel extends along a length of the optical waveguide, the microfluidic channel having a fluid input port and a fluid vent port located on opposing ends of the microfluidic channel, the microfluidic channel forming a fluid path between the fluid input port and the fluid vent port; and
   nanoparticles located on or adjacent the optical waveguide within the microfluidic channel; and
   a fluid collection strip, wherein the integrated photonic chip is located thereon adjacent an end of the fluid collection strip, the fluid collection strip having a fluid channel formed therein, the fluid collection strip having a first input port fluidly connected to the fluid channel and located adjacent an opposing end of the fluid collection strip for receiving a fluid into the fluid collection strip, and a second input port fluidly connected to the fluid channel and located adjacent the integrated photonic chip for allowing fluid to flow through the second input port and into the integrated photonic chip by way of a third fluid input port located on the integrated photonic chip and out of the integrated photonic chip by way of an exit port of the integrated photonic chip and a vent port fluidly connected to the the exit port of the integrated photonic chip.

2. The test strip of claim 1, wherein the integrated photonic chip further comprises, a driving electrode and a backing electrode, wherein the driving electrode is in the silicon substrate and the driving electrode is in the photonic circuit substrate, the optical waveguide located between the driving electrode and the backing electrode positioned over the optical waveguide.

3. The test strip of claim 1, wherein the integrated photonic circuit further comprises a photonic tuning and control circuit, a digital processor core, a memory circuit, a digital interface, and a wireless interface.

4. The test strip of claim 1, the interferometer comprises a modulated path length for an input signal and a fixed path length for a phase modulated output signal.

5. The test strip of claim 4, wherein the interferometer comprises an optical gain circuit, and a phase modulation circuit optical coupled to a Bragg mirror.

6. The test strip of claim 1, wherein a concentration of the nanoparticles is greater on the side surfaces than on the outermost surface.

7. The test strip of claim 1, wherein a portion of the waveguide is uncladded, and the nanoparticles are located on or adjacent the uncladded waveguide.

8. The test strip of claim 1, wherein the waveguide has a serpentine configuration.

9. The test strip of claim 1, further comprising a microfluidic pump fluidly connected to the microfluidic channel.

10. The test strip of claim 1, wherein the fluid collection strip comprises a top film on which the integrated photonic chip is located, a bottom film, and a spacer film, the top and bottom films and the spacer film being attached together to form the fluid channel.

* * * * *